(12) United States Patent
Chang et al.

(10) Patent No.: US 11,831,363 B2
(45) Date of Patent: Nov. 28, 2023

(54) MIMO SYSTEMS WITH ACTIVE SCATTERS AND THEIR PERFORMANCE EVALUATION

(71) Applicant: SPATIAL DIGITAL SYSTEMS, INC., Agoura Hills, CA (US)

(72) Inventors: Donald C. D. Chang, Thousand Oaks, CA (US); Juo-Yu Lee, Westlake Village, CA (US)

(73) Assignee: SPATIAL DIGITAL SYSTEMS, INC., Agoura Hills, CA (US)

( * ) Notice: Subject to any disclaimer, the term of this patent is extended or adjusted under 35 U.S.C. 154(b) by 73 days.

(21) Appl. No.: 16/150,219

(22) Filed: Oct. 2, 2018

(65) Prior Publication Data

US 2019/0044582 A1     Feb. 7, 2019

Related U.S. Application Data

(63) Continuation of application No. 14/733,842, filed on Jun. 8, 2015, now Pat. No. 10,090,891.

(51) Int. Cl.
| | | |
|---|---|---|
| *H04B 7/0413* | (2017.01) | |
| *H04B 7/06* | (2006.01) | |
| *H04B 17/30* | (2015.01) | |
| *H04B 17/391* | (2015.01) | |
| *H04B 17/10* | (2015.01) | |

(52) U.S. Cl.
CPC ......... *H04B 7/0413* (2013.01); *H04B 7/0626* (2013.01); *H04B 17/30* (2015.01); *H04B 17/391* (2015.01); *H04B 17/102* (2015.01)

(58) Field of Classification Search
CPC .... H04B 7/0413; H04B 7/0626; H04B 17/30; H04B 17/391; H04B 17/102
See application file for complete search history.

(56) References Cited

U.S. PATENT DOCUMENTS

| | | | |
|---|---|---|---|
| 10,090,891 B2* | 10/2018 | Chang | H04B 17/391 |
| 2005/0136943 A1* | 6/2005 | Banerjee | H04B 17/21 |
| | | | 375/E1.032 |
| 2005/0253686 A1* | 11/2005 | Shafer | G08B 25/009 |
| | | | 340/572.1 |

(Continued)

*Primary Examiner* — Qutbuddin Ghulamali
(74) *Attorney, Agent, or Firm* — Phuong-Quan Hoang

(57) ABSTRACT

A communications system includes at least one receiver having receiving elements and a transmitter having transmitting elements to transmit signals to the receiving elements via wireless propagation channels. The transmitter includes a beam-forming network and a channel measurement unit. The beam-forming network receives input signal streams at its input ports and outputs one or more signals as shaped beams based on a set of composited transfer functions. The channel measurement unit performs measurements of components of channel status information to generate a set of point-to-point transfer functions and generates the composited transfer functions by computing linear combinations of the point-to-point transfer functions. Each of the point-to-point transfer functions characterizes propagation paths from one of the transmitting elements to one of the receiving elements. The composited transfer functions are point-to-multipoint transfer functions characterizing propagation paths from the input ports of the beam-forming network to one or more of the receiving elements.

20 Claims, 25 Drawing Sheets

(56) References Cited

U.S. PATENT DOCUMENTS

2012/0322362 A1* 12/2012 Coon ................. H04B 7/15557
                                                                    455/9
2013/0142270 A1*  6/2013 Stirling-Gallacher .......................
                                                              H04B 7/0857
                                                                  375/267

* cited by examiner

|  | h1a | h1b | h1c | h2a | h2b | h2c | h3a | h3b | h3c |
|---|---|---|---|---|---|---|---|---|---|
| Path Loss (ratio) | 1.5E-07 | 1.6E-07 | 1.5E-07 | 1.5E-07 | 1.5E-07 | 1.4E-07 | 1.5E-07 | 1.3E-07 | 1.4E-07 |
| phase delay (radians) | 2.738 | 3.017 | 2.133 | 2.855 | 2.138 | 2.013 | 2.014 | 2.097 | 2.185 |
| Phase (deg) | 156.86 | 172.86 | 122.22 | 163.59 | 122.52 | 115.32 | 115.38 | 120.17 | 125.16 |

|  | h4a | h4b | h4c | h5a | h5b | h5c |
|---|---|---|---|---|---|---|
| Path Loss (ratio) | 1.3E-07 | 1.6E-07 | 1.5E-07 | 1.2E-07 | 2.6E-07 | 1.4E-07 |
| phase delay (radians) | -3.113 | -2.408 | -1.089 | 2.173 | -3.005 | 3.919 |
| Phase (deg) | -178.38 | -137.96 | -62.39 | 124.53 | -172.17 | 224.51 |

FIG. 5.

A volume of coherency for a "fetch factor" (Ff) following simple Huygens Principle

LOS propagation

$$Po_{ry} = [P_{tx}G_{tx}/(4\pi R_0^2)] * Ar_y = (A_{tx} * Ar_y/R_0^2 * \lambda^2)$$

1612

Via a scattering cross-section

$$P_{rz} = [P_{tx}G_{tx}/(4\pi R_1^2)] * Ar_z \text{ and}$$

$$P1_{ry} = [P_{tz}G_{tz}/(4\pi R_2^2)] * Ar_y$$

Assuming $P_{tz} = P_{rz}$, then $$P1_{ry} = [P_{tz}G_{tz}/(4\pi R_2^2)] * Ar_y$$
$$= P_{tx}G_{tx}G_{tz} * Ar_y[(4\pi R_1^2) * (4\pi R_2^2)] * Ar_z$$

For $P1_{ry} = Po_{ry}$, $$1/(4\pi R_0^2) = Ff \cdot G_{tz} \cdot A_{rz}/(4\pi R_1^2)(4\pi R_2^2)$$

$$= Ff \cdot A_{tz} \cdot A_{rz}/[4\pi \lambda^2 R_1^2 R_2^2]$$

Therefore; $Ff = \lambda^2 R_1^2 R_2^2/(R_0^2 A_{tz} \cdot A_{rz})$

We have assumed $G_{rz} = G_{ta} = 1$ implying $A_{tz} = A_{rz} = \lambda^2/4\pi$ $$Ff = (4\pi)^2 R_1^2 R_2^2 / (R_0^2 \lambda^2) = [4\pi \cdot R_1 \cdot R_2/(R_0 \cdot \lambda)]^2$$

or, $Ff\,(dB) = 20 \cdot \log 10[4\pi \cdot R_1 \cdot R_2/(R_0 \cdot \lambda)]$

FIG. 16B

MIMO SYSTEMS WITH ACTIVE SCATTERS AND THEIR PERFORMANCE EVALUATION

RELATED APPLICATIONS

This application is a continuation of application Ser. No. 14/733,842, filed on Jun. 8, 2015, entitled "MIMO Systems with Active Scatters and their Performance Evaluation", which is incorporated herein by reference in its entirety.

This application is related to
- a. a U.S. patent application Ser. No. 14/182,665, filed on Feb. 18, 2014, entitled "Multi-user MIMO via frequency re-use in smart antenna,"
- b. a U.S. patent application Ser. No. 14/193,540, filed on Feb. 28, 2014, entitled "Multi-user MIMO via active scattering platforms,"
- c. a U.S. patent application Ser. No. 14/288,707, "filed on May 28, 2014 Active scattering for bandwidth enhanced MIMO."

All of the above are incorporated herein by reference in their entireties.

DESCRIPTION

A multiple-user communications system for a point-to-multipoint (p-to-mp) via active scattering repeaters for efficient frequency reused is described. The propagations channels dominated by multipath effects are characterized by a composited transfer function technique. One feature of the systems is a multipath dominated MIMO communications channel comprising of multiple active scattering repeaters. Active scatters may be stationary, relocatable, or mobile and may be implemented via man-made platforms such as on tops of trucks, unmanned auto mobiles, unmanned air vehicles (UAVs) in flight or parked UAVs. They may be implemented as small units in forms of light bulbs or extensions on lightbulb Socket. In addition to signal bandwidth, amplification levels, path delays on scattered or re-radiated signals for active scatters, positions and orientations of these scattering devices are individually controllable strategically to enhance multiple-user MIMO communications systems. These are techniques to deploy controllable multipath propagation channels between a group of transmitting terminals and another group of receiving terminals

BACKGROUND

Depicted in FIG. 1 is an idealized MIMO operation scenario with two pairs of user groups communicating between desired terminals independently and concurrently via a common frequency slot without mutual interferences. It would be nice to have total 3× frequency re-use of the allocated frequency slot; 2× for sending Sa and Sb from Atx to Arx while 1× for transmitting Sc stream from Btx to Brx. In real world, techniques of MIMO are used to minimize mutual interferences by taking advantages of multiple paths in the 3 communication channels.

The scenario may be expanded to more than two communicating groups, several of them might be communicating simultaneously. Distributed MIMO systems usually addressed capacity in benign scenarios and are generally limited to closed, narrowly focused systems, and do not address the complexity of radios automatically negotiating collaboration groups and roles or the advanced signal processing to suppress interference and increase energy to a particular location in order to maximize the link characteristics. Further, existing work does not show how different groups can optimally communicate given this information.

SUMMARY OF THE INVENTION

This disclosure on communications systems is summarized as followed:

Communications channels from a transmitting source to multiple receiving destinations are through active scattering from many distributed scattering devices including repeaters and transponders.

Frequency reuse is accomplished by directional diversity in transmitters via formulations of point-to-multipoint (p-to-mp) composited transfer functions and optimizations on the formulated functions under multiple specified performance constraints for user identifications and discriminations.

Optimizations are through beam shaping techniques under performance constraints associated with locations indexed by user identifications or indexed by user element identifications.

A composited transfer function is optimized to represent an optimally shaped beam, featuring a point-to-multipoint (p-to-mp) characteristics including integrated multipath propagation effects of actively scattering repeaters/transponders with favorable connectivity for one specified user and discrimination against others.

A composited transfer function for transmitting data through multipath dominated channels. It is used for specified performance constraints for a shaped transmitting beam. A radiation pattern, or a wavefront, of the shaped beam is a linear combination, or a weighted sum, from radiation patterns, or wavefronts, of multiple transmitting elements. The shaping of a radiation pattern are through altering the weighting parameters of the linear combination.

The shaping techniques may also be used for specified performance constraints for a shaped receiving beam. A reception pattern, or a wavefront, of the shaped receiving beam is a linear combination, or a weighted sum, from reception patterns of multiple receiving elements. Shaping a reception pattern are through altering the weighting parameters of the linear combination, under performance constraints for optimization via
1. Orthogonal beam (OB) criteria
2. Quiet zone criteria, and
3. Others.

Multiple concurrent beams are optimized under performance constraints by a set of many composited transfer functions. This disclosure describes exemplary embodiments on improving the operation and use of MIMO communication methods and systems for multiple users (MU) to re-use same spectrum such as through channel state information (CSI) to form performance constraints in user-selection and/or rejection processing on transmission or reception side. Embodiments pertain to wireless communications through a multipath dominated channel, where the multipaths are dominated through man-made active scattering devices including repeaters and transponders. These repeaters/transponders are in parallel scattering paths between a signal source to multiple destinations providing amplifications, delays and directional adjustments for propagating signals.

When the sources and destinations are indoor for many embodiments, distributed repeaters serve as active scatters, which perform receiving, low-noise-amplifying, filtering, power-amplifying, and re-radiating functions for signals through the repeaters. To avoid self-triggered oscillations, many repeaters may feature slight frequency shifts, or stored and forward capability. Some repeaters may feature input and outputs at a same carrier frequency but with large spacing between transmitting and receiving elements.

For many other embodiments, distributed transponders serve as active scatters, which perform functions of receiving, low-noise-amplifying, filtering, frequency translating, power-amplifying, and re-radiating for signals in a transmitting frequency.

A repeater may consist of two transponders spatially separated in two locations but cascaded functionally. A first transponder is for receiving functions capturing desired signals in f1, which are amplified, filtered, and frequency translated before radiated out by a separated aperture at f2m. A second transponder captures the amplified signals at f2m, which are amplified, frequency translated, filtered, and power amplified before radiated out by another separated aperture at f1.

In some embodiments, MIMO configurations feature a point-to-point (p-to-p) architecture with a source at a communication hub via radiations to multiple repeaters and then re-radiations from these repeaters to a destination which is in a common coverage of these repeaters. The MIMO configurations may also feature a point-to-multipoint (p-to-mp) architecture with a source at a communication hub via radiations to multiple active scattering devices, and then re-radiation from the multiple scattering devices to multiple destinations.

In the MIMO systems of present invention, serving signals for transmission to user equipment (UE) via multiple paths will utilize composited transfer functions selected and characterized based on channel state information (CSI), which comprises of responses from probing signal sequences for a propagation channel dominated by multipaths in accordance with a dynamic user distribution. Each propagating path may feature unique functional effects from a set of scattering devices. The composited transfer functions are constructed or shaped to be "user dependent" with enhanced responses to a selected user and suppressed ones for other users. When operating in coordinated modes, more cooperating UEs are configured to suppress interference to other UE using the same frequency resources. Optimization methods for the composited transfer functions based on selected criteria have been presented in related patent applications listed above. Some embodiments relate to coordinated point-to-multipoint (p-to-mp) communications in spoke-and-hub configurations. The criteria for shaping the composited transfer functions for a transmitter in a communications hub may include those in many beam-shaping techniques, such as orthogonal beams (OB), quiet-zones, and others. Some embodiments relate to wavefront multiplexing (WF muxing)/demultiplexing (demuxing) as means for coordinated or organized concurrent propagations through multipath dominated channels. As a result, methods for calibrations and equalizations among multiple path propagations become possible. Some are through forward paths only. Consequently, implementations of techniques on coherent power combining in receivers for enhanced signal-to-noise ratios (SNR) are simple and cost effective.

In short, there are two features in the disclosures for multi-user MIMOs to achieve frequency reusing for over hundred folds deterministically, not just statistically;
1. Composited Transfer Functions
    Featuring point-to-multipoint (p2mp) performance, generated by
        linear combinations of multiple Channel-Status-Information (CSI) components as P/Q matrixes,
        Specified performance constraints,
        P/Q matrix optimized via Beam Shaping Optimization programs.
2. Multipath via active scattering;
    Scattering by active electronic devices on movable or re-locatable platforms;
    enabling some controls over multipath propagation channels,
    Simple techniques to have >>10× frequency reuse potentials Presented are MIMO communications architectures among terminals with enhanced capability of frequency reuse by strategically placing active scattering platforms at right places. These architectures will not depend on multipaths passively from geometry of propagation channels and relative positions of transmitters and those of receivers. For advanced communications which demand high utility efficiency of frequency spectrum, multipath effects are purposely deployed through inexpensive active scattering objects between transmitters and receivers enable a same frequency slot be utilized many folds such as 10×, 100× or even more. These active scatters are to generate favorable geometries of multiple paths for frequency reuse through MIMO techniques. These scatters may be man-made active repeaters, which can be implemented as small as 5 to 10-watt lightbulbs for indoor mobile communications such as in large indoor shopping malls. The architecting concept can be certainly implemented via mini-UAV platforms parking on tops of light-poles, or tree tops, or tops of stadiums, or circulating in small "figure-8" or small circles slowly. This system can be pushed to facilitate >>100× frequency reuses among users. It may be one of possible solutions for 5G deployment and many other applications which needs high efficiency in frequency utility.

BRIEF DESCRIPTION OF THE DRAWINGS

FIG. 5 depicts calculated channel status information (CSI) between 3 Tx and 5 Rx elements based on 5 active scatters and LOS propagation paths; two important components; path loss and phase delays.

FIG. 16A depicts formulations in calculating a Fetch factor (Ff); power at a destination via line-of-sights path, and power at destination via a virtual scattering mechanism.

FIG. 16B depicts formulations in calculating a Fetch factor (Ff) for a virtual scatter so that the resulting power in a destination from a LOS method shall be identical to that via calculating scattering effects by a virtual scatter

DETAILED DESCRIPTION

Figure 1:
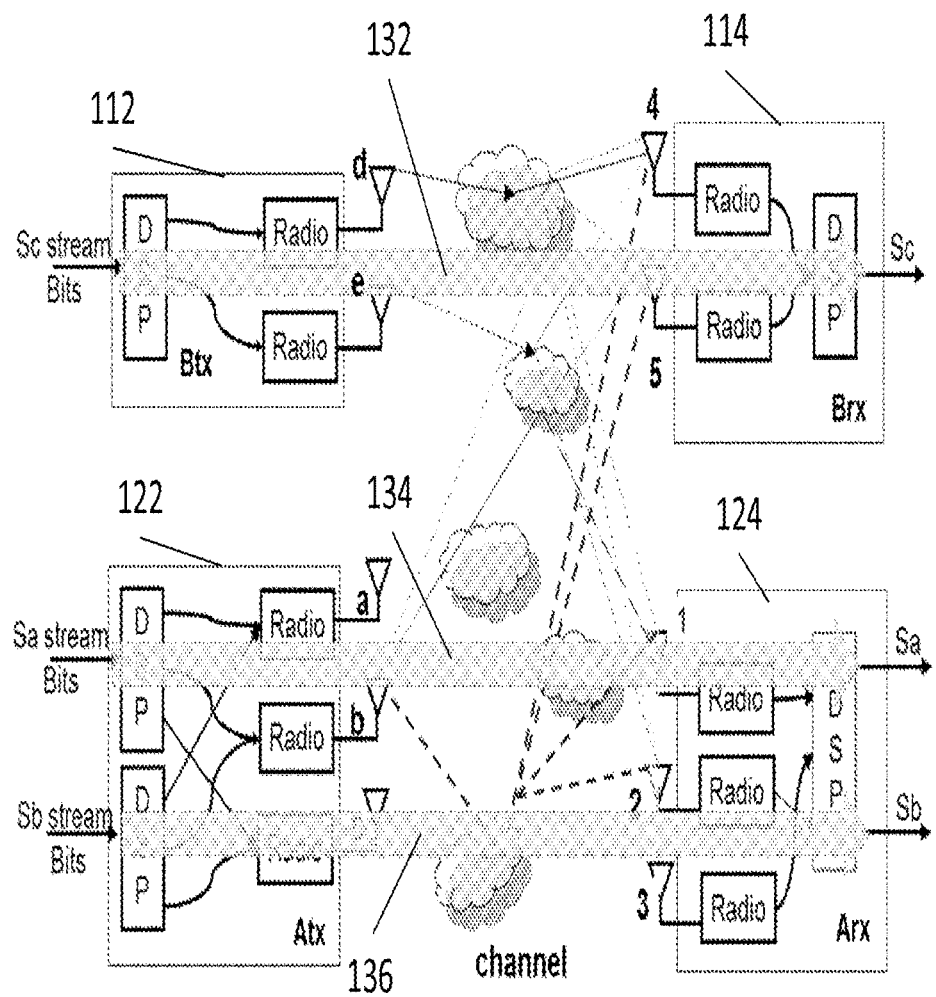
FIG. 1 depicts an idealized MIMO operational scenario for 3× frequency reuse over a common frequency slot; 2× for between [Atx, Arx] and 1× for between [Btx, Brx].

FIG. 1 depicts an idealized MIMO operation scenario with two pairs of user groups communicating between desired terminals independently and concurrently via a common frequency slot without mutual interferences. The first group is between a first transmitter Atx 122 with 3 transmitting (Tx) elements and a first receiver Arx 124 with 3 receiving (Rx) elements. It would be nice to have total 3×frequency re-use of the allocated frequency slot; 2× for sending Sa via a first channel 134 and Sb via a second channel 136 from Atx to Arx and while 1× for transmitting Sc stream via a third channel 132 from Btx to Brx. In real world, techniques of MIMO are used to minimize mutual interferences by taking advantages of multiple paths in the 3 communication channels concurrently utilizing a common frequency slot. The scenario may be expanded to more than two communicating groups, several of them might be communicating simultaneously.

Our proposed advanced MIMO solutions for enhanced bandwidth utility are based on a patented method a U.S. patent application Ser. No. 14/182,665, filed on Feb. 18, 2014, entitled "Multi-user MIMO via frequency re-use in smart antenna" in generating Composited Transfer Functions (CTF) based on measured channel status information (CSI) of conventional MIMO. Proposed solutions using active scatters for MIMO communications among multiple user groups will quantify the amount of interference suppression (both in terms of interference power levels and number of distinct interferers) possible in addition to the inter-group communication bandwidth, as well as optimization techniques for using some or all group members for a single communications link, or multiple communications links.

Figure 2:
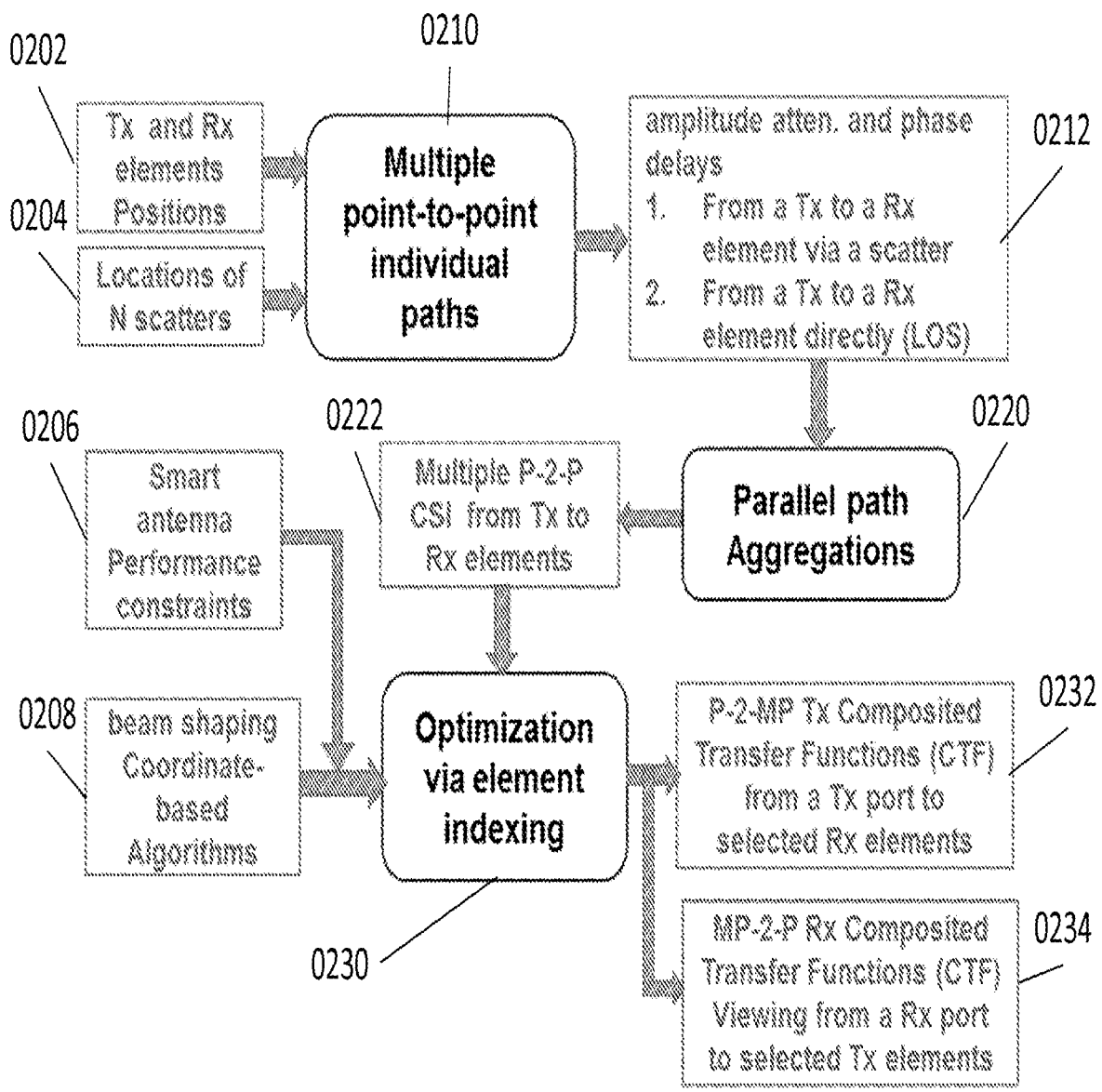
FIG. 2 depicts a flow chart of simulating CSI for MIMO and generating Tx or Rx CTF's based on obtained CSI via performance optimization in Tx or Rx sites, respectively.

A flowchart of methods simulating or obtaining CSI information via real time measurements and generating CTF's are depicted in FIG. 2. There are three steps. The first step 0210 will utilize conventional CSI information collected from "multiple point-to-point (p2p) paths" initiating from a transmitting (Tx) element to a receiving (Rx) element 0212 including via a scatter and then to the Rx element for all scatters, as well as via a line-of-sight (LOS) direct path to the Rx element individually. This simulation step requires knowledge of positions and orientations of Tx and Rx elements 0201 and locations for all active scatters 0204.

The second step 0220 is to group all parallel paths from a Tx element to a Rx element as a p2p transfer functions. The connectivity performances cannot be specified in directions in most MIMO antenna geometries but through position indexing techniques on both transmit and receiving elements involved.

The third step 0230 will involve optimally weighting and summing of multiple p2p functions to become composited transfer functions (CTF) which must meet various performance constraints 0206. Optimizations 0230 may be realized through optimization algorithms 0208 which may include iterative techniques. The connectivity performance optimization also cannot be specified in directions in any MIMO geometries but through position indexing techniques on both transmit and receiving elements involved. The results may be grouped into two categories; (1) a first group of P-2-MP Tx CTF 0232 characterizing a Tx port to selected Rx elements and (2) a second group of MP-2-P Rx CTF 0234 featuring a Rx port from selected Tx elements.

In this disclosure we shall focus on how a function in the first group, P-2-MP Tx CTF 0232, is created and its connectivity and discrimination performances are evaluated over a coverage area of our interest. The same principles can be extended to examples of the second group, MP-2-P Rx CTF 0234.

CSI Calculation in the Simulation

Figure 3:
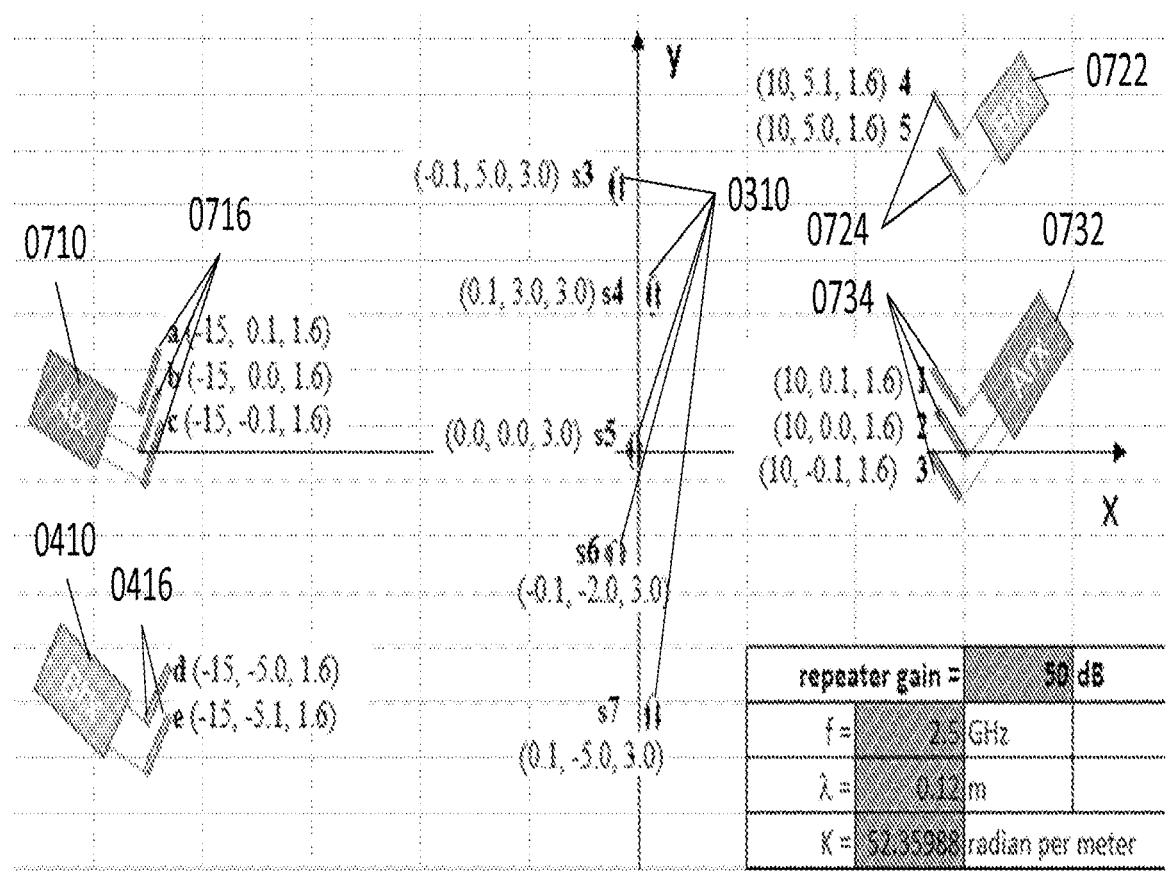
FIG. 3 depicts geometrical distributions for calculating CSI and CTF; including transmitting and receiving antenna elements and scatters. There are two communications pairs [Atx, Arx] and [Btx, Brx] utilizing a same frequency slot. Each of [Atx, Arx] features 3 antenna elements, and each of [Btx, Brx] features 2 antenna elements.

FIG. 3 shows geometrical distributions in X-Y plane for 2 transmitters 0710 and 0410, 2 receivers 0722 and 0732, and 5 scatters 0310 in following simulated results. The coordinates for all 5 transmitting, 5 receiving elements and 5 scatters are indicated in meters. A piece of CSI comprises a set of propagation information between a transmitting element and a receiving element featuring a point-to-point (p2p or p-2-p) transfer function. As depicted a CSI through a multipath dominated channel between a transmitting (Tx) element "a" of three Tx elements 0716 of an Atx transmitter 0710 to a receiving element "4" of two Rx elements 0724 of a Brx receiver 0722 is represented as $h_{4a}$ (an element in a H matrix) representing a path attenuation and a phase delay aggregated from multipaths through the communication channel from element "a" of the 3 Tx elements 0716 to element "4" of the 2 Rx elements 0724.

In calculations of all following examples, it is important to note that the receiving elements are indexed along a line parallel to the y-axis at x=x0. In most of the examples, xo is set at 10 m. The element indexes are set to show any adjacent receiving elements are separated by a delta number of indexes more than 1. As a result, elements can be identified via element indexes and the element positions along the line of x=10 m parallel to the y-axis. Therefore, CTF performance certainly can be plotted as function of y position alone the line at x=10 m and also may be plotted or interpreted as a function of indexes for receiving elements. With such a convention, antenna engineers may associate their knowledge on antenna directional patterns to the plots of CTFs. We will come back to FIG. 3 and discuss more on simulation assumptions.

Figure 3A:
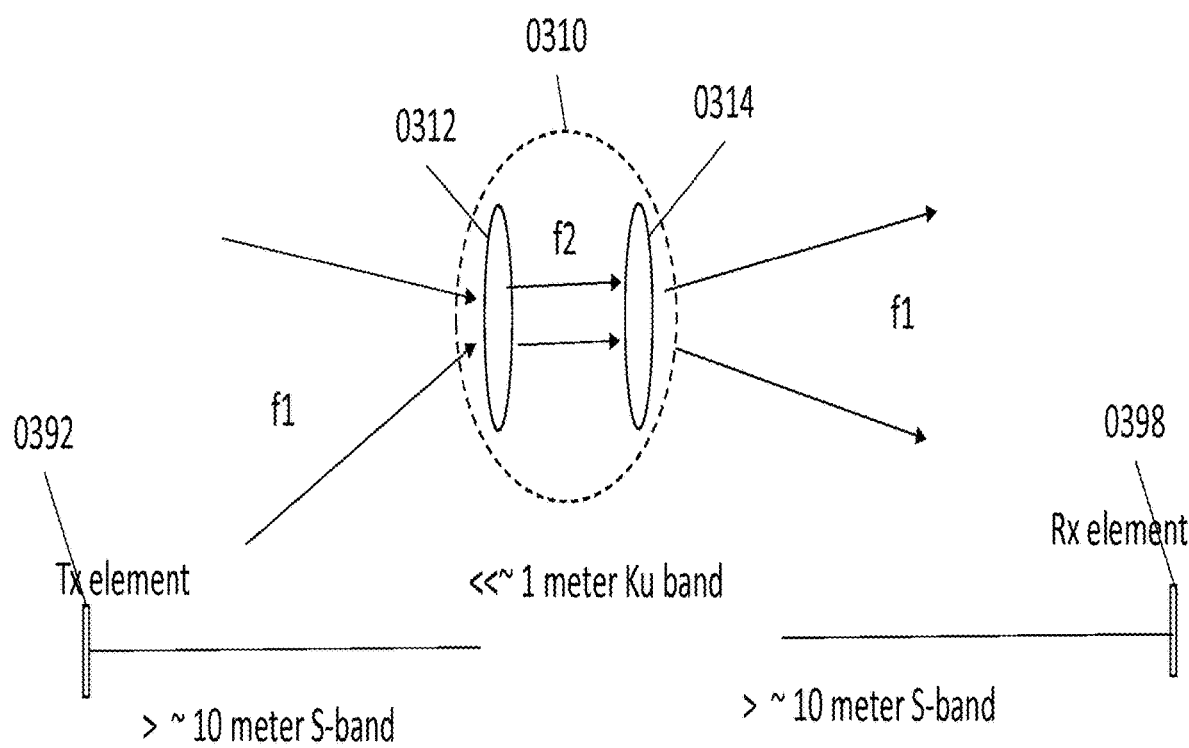
FIG. 3A depicts simplified architecture of an active scattering device via two cascaded transponders; a first transponders with input at f1 and output at f2 while a second transponder are in series with the first one features an input at f2 and an output at f1. F1 and f2 may be in S-band and Ku band, respectively. These two transponders, one for S-to-Ku band and the other for Ku-to-S band, reasonably separated to minimize self-oscillations, are configured to form a S-band repeater.

FIG. 3A illustrates an example of a repeater 0310 to function as an active scatter. It comprises of two cascaded transponders 0312 and 0314, each with amplifications and frequency translation functions. It is arranged with a finite short distance or orientations to minimize potentials of self-oscillations which is a degrading feature a conventional repeater usually exhibit due to its outputs unintentionally coupling back to its inputs when operating in a high gain mode. The first transponder 0312 features an input at f1 and output at f2, while the second transponder 0314 has an input at f2 and an output at f1. The example in FIG. 3 depicts an S-band communication channel between a Tx element 0392 and a receiving element 0398 separated at >20 meters. An S-band repeater 0310, located in between the Tx element 0392 and the Rx element 0398, comprising of two transponders separated about 1 meter apart and interconnected in Ku band, deliver a range of about amplifications from 50 to 70 dB typically in various configurations.

Figure 3B:
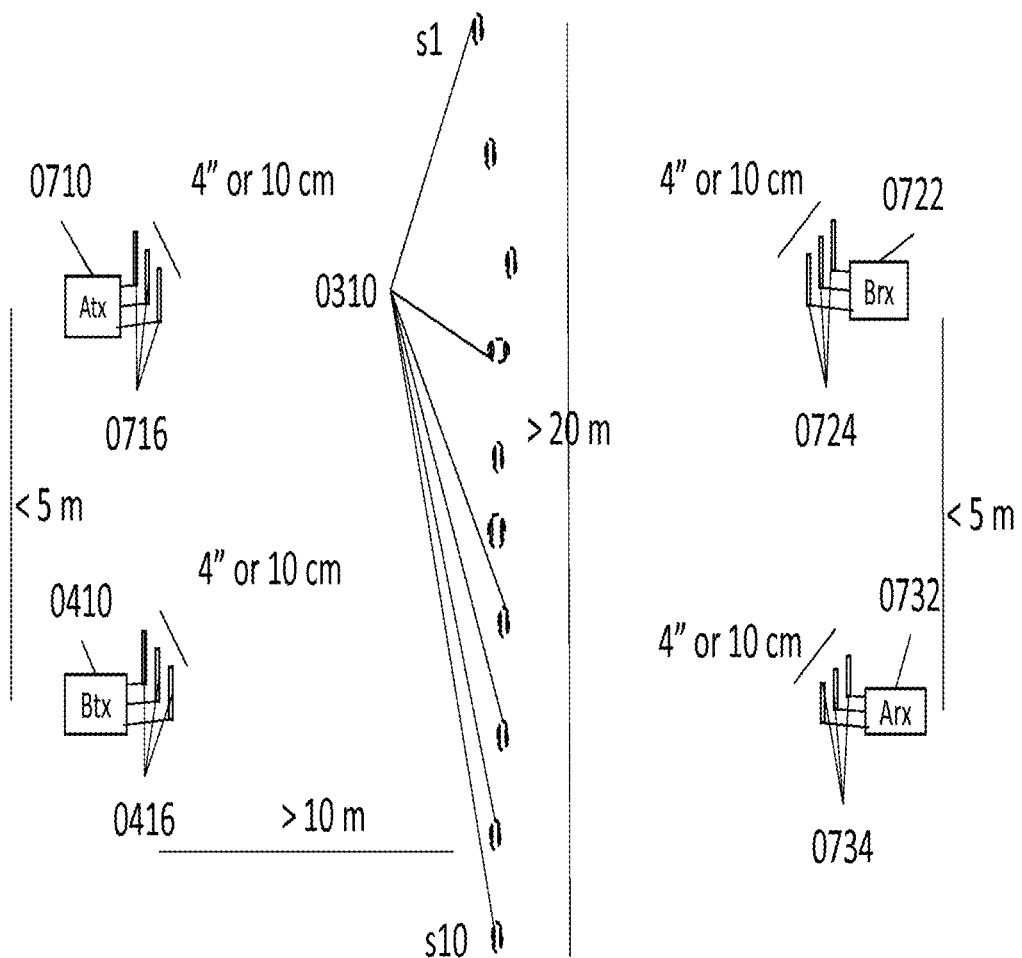
FIG. 3B depicts coordinates of key elements in a simple geometry: with 10 representative active scatters (I) and two communications pairs [Atx, Arx] and [Btx, Brx] utilizing a same frequency slot each with multiple antenna elements. In all transmitters and receivers here, each features three antenna elements.

In our current Matlab simulation configurations as depicted in FIG. 3B, flexibility is limited for a given study. However, it is still possible to use up-to 10 active scatters in calculations among communications of two pairs of users [Atx 0710, Arx 0732] and [Btx 0410, Brx 0722] and with a maximum of total 6 Tx elements 0716 and 0416, and total 6 receiving elements 0724 and 0734. Simulation configurations can be "degenerated" to, for instance, a scenario with one transmitter featuring 6 Tx elements and two separated receivers; one with a group of 2 Rx elements and the other with another group of 3 Rx elements.

Figure 3C:
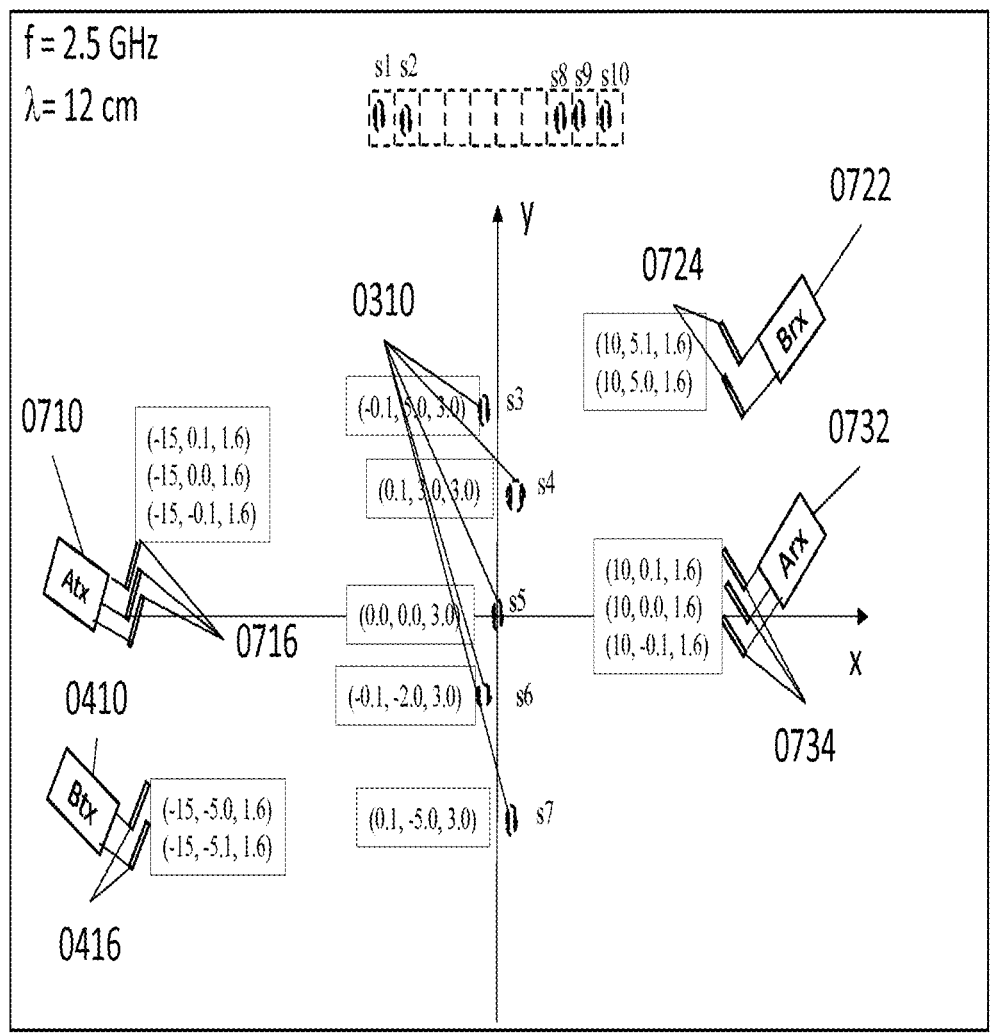
FIG. 3C depicts coordinates of key elements in a simple geometry: with 5 representative active scatters (s3, s4, s5, s6, and s7) (II), two communications pairs [Atx, Arx] and [Btx, Brx] utilizing a same frequency slot. Each of [Atx, Arx] features 3 antenna elements and each of [Btx, Brx] features 2 antenna elements. The positions of all antenna elements and those of the 5 active scatters are indicated.

In this disclosure, most of the simulation results are from a geometry depicted in FIG. 3C; with 5 active scatter 0310 in calculations among communications of two pairs of users [Atx 0710, Arx 0732] and [Btx 0410, Brx 0722] and with 5 transmitting elements 0716 and 0416 total, and 5 receiving elements 0724 and 0734 total. The 3 elements 0716 for Atx transmitter 0710 are in a linear array with a 10 cm spacing between adjacent elements. The 2 elements 0416 for Btx transmitter 0410 are also in a linear array with a 10 cm spacing between adjacent elements. The two transmitters are separated by 5 meters in y-direction. AS shown, the Atx transmitter 0710 and the Arx receiver 0732 are separated by 25 meters in x-direction. On the other hand, the Btx transmitter 0410 and the Brx receiver 0722 are separated by 25 meters in x-direction and 10 meter in y direction. The 5 active scatters are −15 meter away from the two transmitters and 10 meters away from two receivers in x direction, and are distributed in y direction almost linearly with spacing of 2 or 3 meters between adjacent ones.

Transmitting elements 0716 for Atx 0710 in a (x, y, z) coordinate are at (−15, 0.1, 1.6), (−15, 0.0, 1.6), and (−15, −0.1, 1.6). The receiving elements 0734 for Arx 0732 in the (x, y, z) coordinate are at (10, 0.1, 1.6), (10, 0.0, 1.6), and (10, −0.1, 1.6), respectively.

Transmitting elements 0416 for Btx 0410 in the (x, y, z) coordinate are at (−15, −5.0, 1.6), and (−15, −5.1, 1.6). The receiving elements 0724 for Brx 0722 in the (x, y, z) coordinate are at (10, 5.1, 1.6), and (10, 5.0, 1.6), respectively.

The 5 active scatters 0310 in the (x, y, z) coordinate are at (−1.0, 5.0, 3.0), (1.0, 3.0, 3.0), (0.0, 0.0, 3.0), (−1.0, 2.0, 3.0), and (1.0, −5.0, 3.0), respectively.

It is intended for S-band operations at 2.5 GHz with a wavelength of 12 cm. The gain in active scatters are set at 50 dB as a fetch factor. See details in FIG. 16.

Figure 3D:
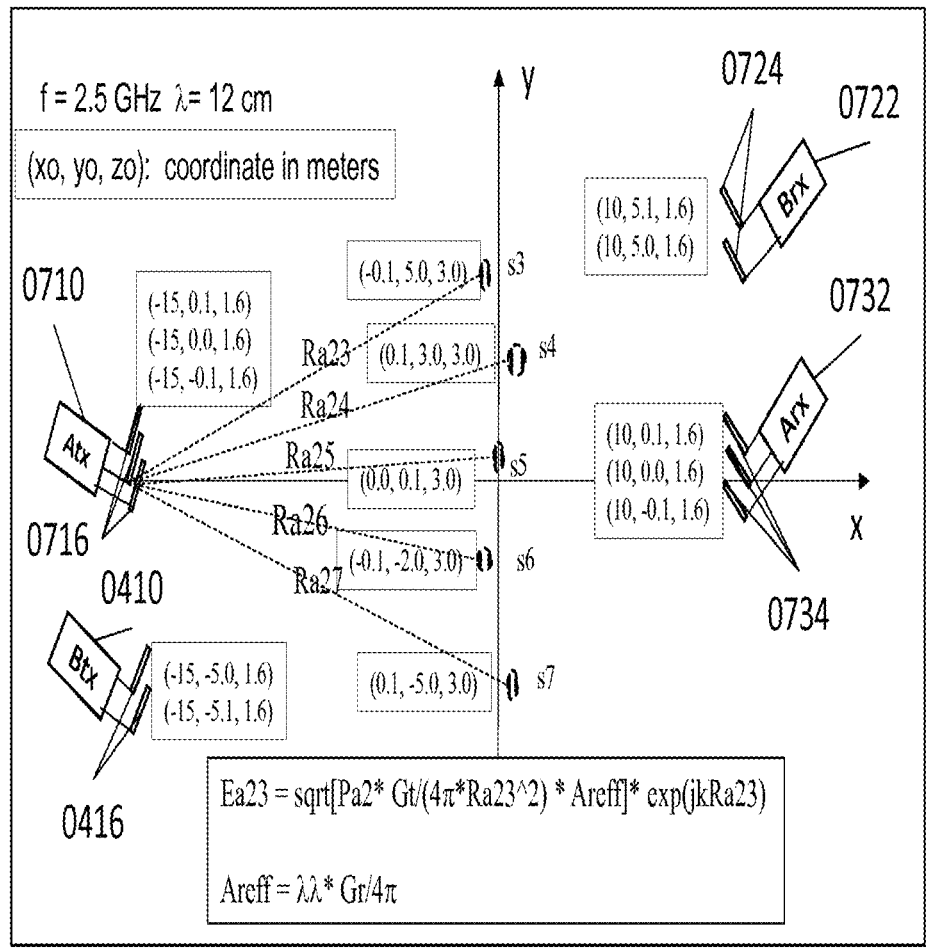
FIG. 3D depicts coordinates of key elements in a simple geometry: with 5 representative active scatters (s3, s4, s5, s6, and s7) (III). The positions of all antenna elements and those of the 5 active scatters are indicated. Path loss and phase delay calculating formulations are high-lighted from element "a" of a first transmitter Atx to one of the 5 scatters, s3.

FIG. 3D depicts path loss and phase delay calculation. Calculating formulations are high-lighted from element "a" of the three elements 0716 of a first transmitter Atx 0710 to one, "s3", of the 5 scatters 0310. Coordinates of 5 representative active scatters (s3, s4, s5, s6, and s7) 0310 are shown. Indicated also are the positions of all antenna elements; including three 0716 from Atx 0710, two elements 0416 from Btx 0410, three 0734 from Arx 0732, and two elements 0734 from Brx 0732. Formulation of received electric field by the scatter "a", Ea23, following convention link calculations, is repeated as following;

$$Ea23 = sqrt[Pa2*Gt/(4\pi*Ra23^2)*Areff]*exp(jkRa23) \quad (1)$$

where;

Pa2: radiated total power by element "a";

Gt: antenna gain of element "a";

Ra23: distance from element "a" to scatter "s3";

Areff=$\lambda^2$*Gr/4$\pi$;

Gr: receiving antenna gain of "s3";

k: wave number and k=$\lambda/2\pi$.

Figure 3E:
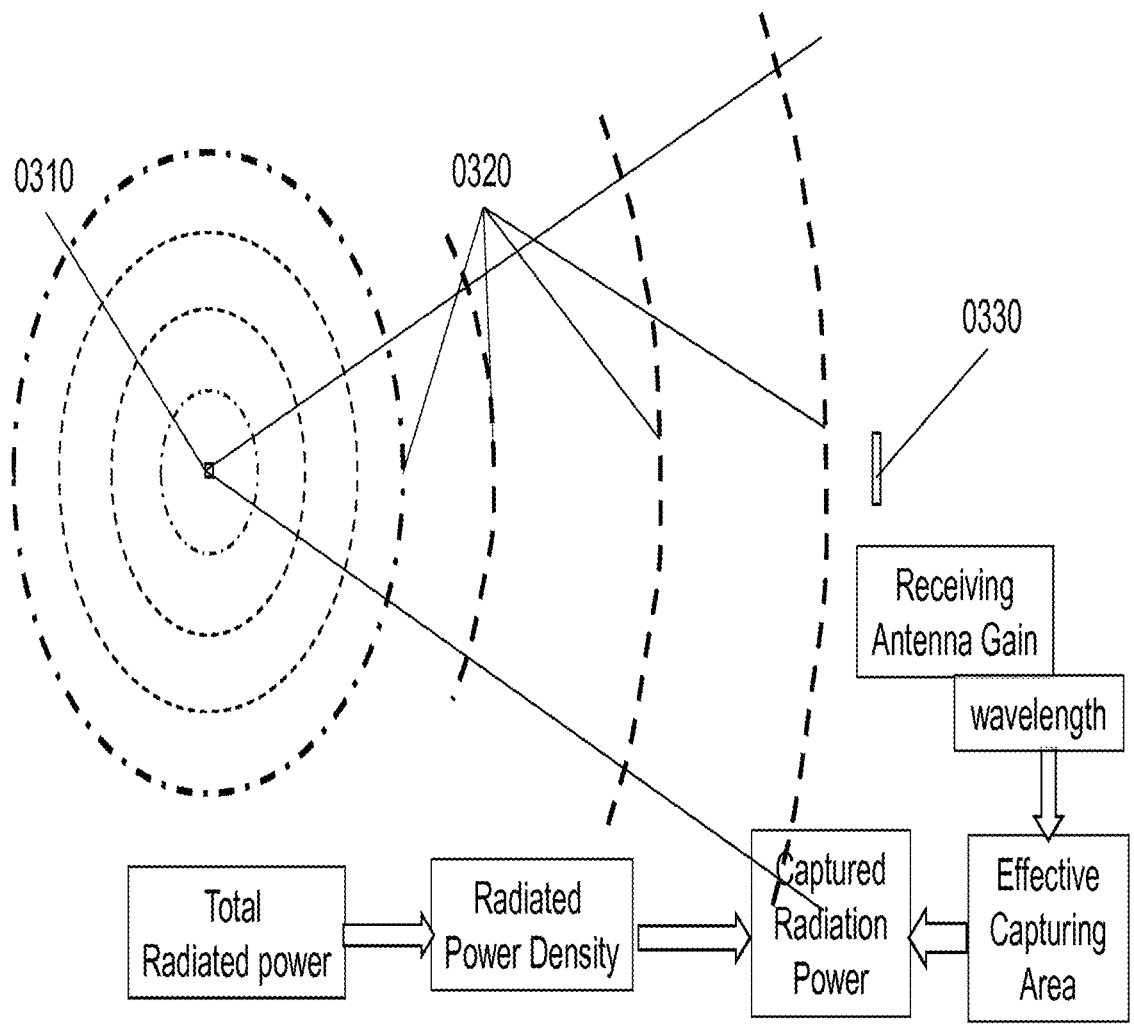
FIG. 3E depicts functional block diagram of calculating captured radiation power in a receiver from a transmitter with omni-directional or isotropic transmission following a link equation.

FIG. 3E depicts functional block diagram of calculating captured radiation power in a receiver 0330 from a transmitter 0310 with omni-directional or isotropic transmission following a link equation. Divergent power density from the transmitting source 0310 at various distances 320 are calculated. Using similar link equation like equation (1), captured power by a receiving antenna element 0330 is also calculated.

Figure 3F:
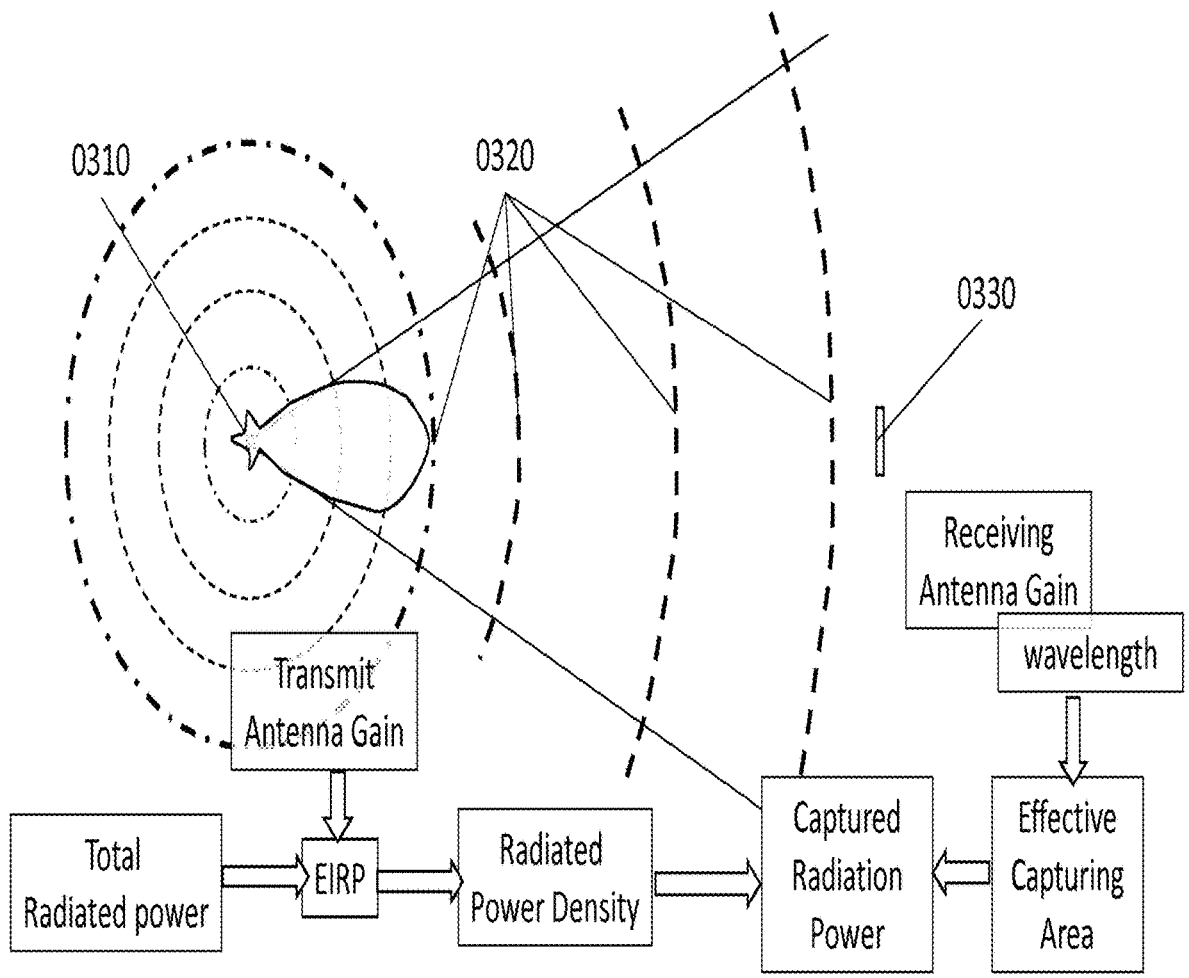
FIG. 3F depicts functional block diagram of calculating captured radiation power in a receiver from a transmitter with directional transmission following a link equation.

FIG. 3F depicts functional block diagram of calculating captured radiation power in a receiver from a transmitter with directional transmission following a link equation. Divergent power density from the transmitting source 0310 at various distances 320 are calculated. Using similar link equation like equation (1), captured power by a receiving antenna element 0330 is also calculated.

Figure 4:
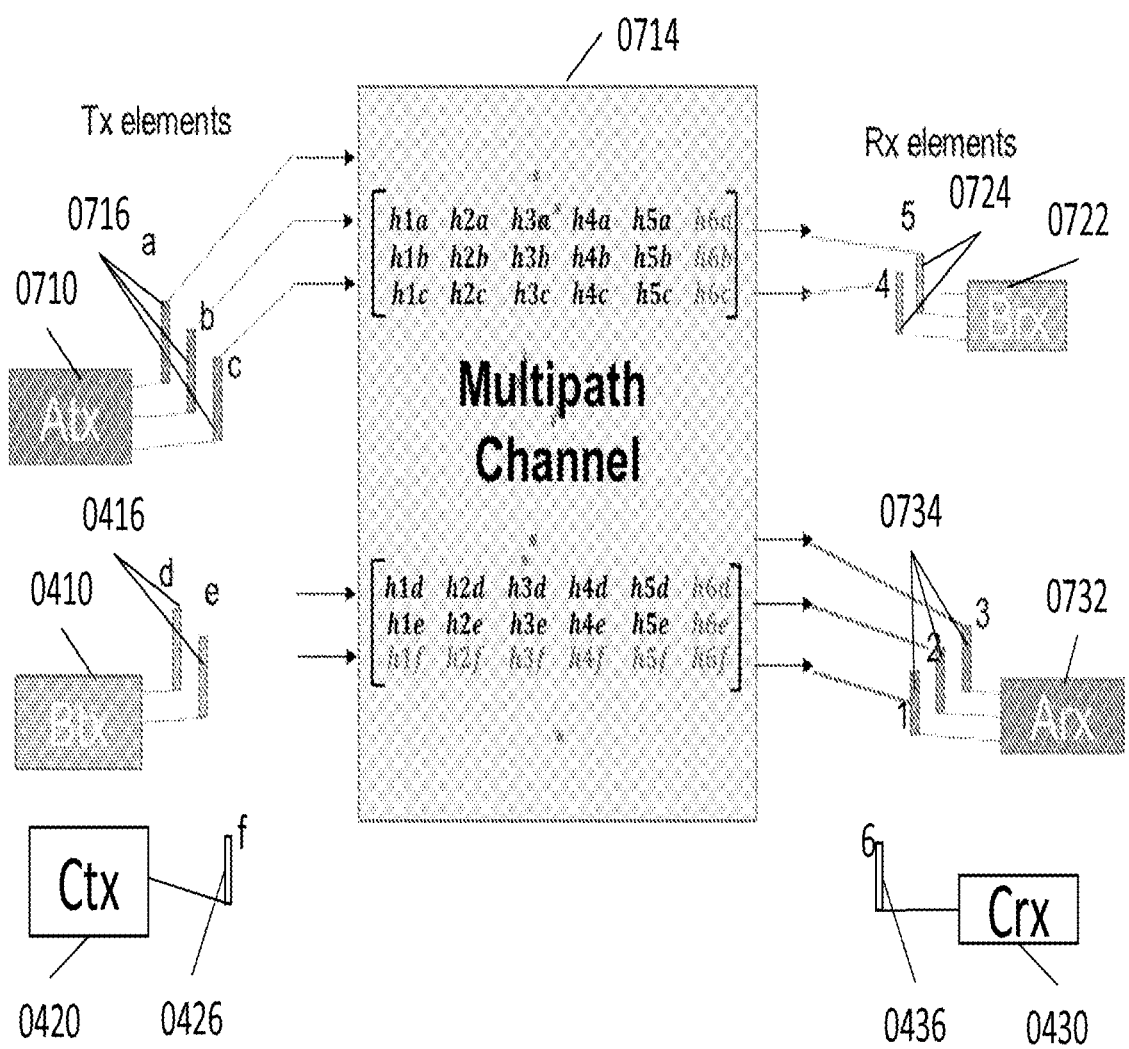
FIG. 4 depicts channel transfer functions (CTF) in H-matrices; with 6 Tx elements (a, b, c, d, e, f) and 5 Rx elements (1, 2, 3, 4, 5). A first H matrix characterizes from elements of a first transmitter Atx to all elements in two receivers Arx and Brx. A second H matrix characterizes from elements of a second transmitter Btx to all elements in the two receivers Arx and Brx.

The H matrix in FIG. 4, currently depicted as two 3×6 submatrixes, features a 6×6 matrix 0714 representing 36 individual transfer functions for 6 transmitting elements and 6 receiving elements. 5 of the 6 elements in both Tx and Rx are distributed in two groups of communications pairs; [Atx 0710, Arx 0732], and [Btx 0410, Arx 0722]. The C group [Ctx 0420, Crx 0430] features one Tx element (element "f") 0426 in Ctx 0420 and one Rx element (element 6) 0436 in Crx 0430. It may be added in different operation scenarios demonstrating different degree of freedoms and spatial resolutions.

The effects of the 6$^{th}$ elements in the H matrix are additional components in the 6$^{th}$ row and those in the 6$^{th}$ columns in a blue color. In fact, without the third pairs, the H matrix 0714 features two sub-matrixes. The first is a 5×3 sub-matrix for the transfer functions from the 3 Tx elements 0716 of Atx 0710 to all 5 receiving elements 0724 and 0734. The second is a 5×2 sub-matrix for the components from the 2 Tx elements 0416 of Btx 0410 to all 5 receiving elements 0724 and 0734.

FIG. 5 depicts an example with 15 calculated transfer functions components in a first 3×5 H submatrix for the 3 Tx of elements (a, b, and c) 0716 of the Atx 0710 to 5 Rx elements (1, 2, 3, 4, and 5) 0724 and 0734 in FIG. 3.

Formulations of Tx Composited Transfer Functions (Tx CTFs)

Figure 6:
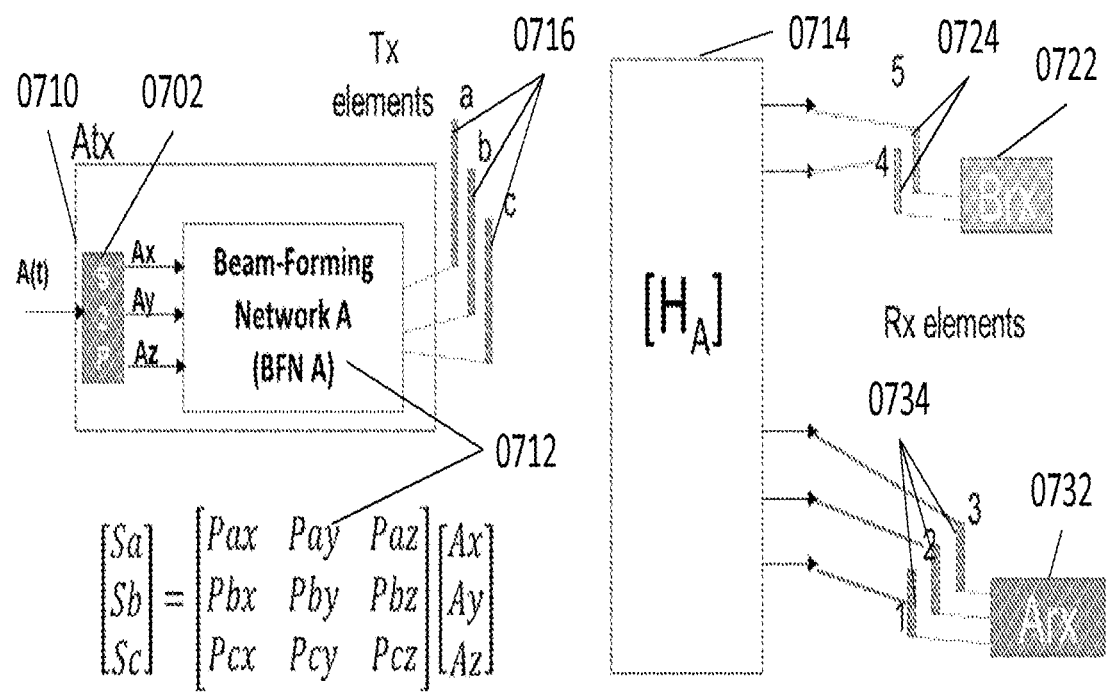
FIG. 6 depicts a set of Tx CTFs for a 1st transmitter Atx; 3 shaped beams generated by a Tx beam-forming-network (BFN).

A transmit CTF comprises a beam forming network 0712 for a dynamic shaped beam followed by an H matrix 0714 with many p2p transfer function components as shown in FIG. 6. We have added feedback paths for obtaining or measuring CSI 0708 in FIG. 7. Examples of performance constraints 0704 are delineated.

In our simulation geometries in FIG. 3, the component, h4a, represents a transfer function with effects of 6 parallel paths from the Tx element "a" of the 3 array elements 0716 to the Rx element "4" of the two array elements 0724. The 6 paths comprise of a line-of-sight (LOS) path, and 5 parallel paths due to scattered by 5 separated scattering centers (s3, s4, s5, s6, and s7) 0310 individually. Path attenuations and phase delays from every scattering path are calculated from two propagation segments in series; as an example, from a Tx element (element a) of the 3 array elements 0716 to a scatter (s6) in 0310 and then from the scatter (s6) in 0310 to an Rx element (element 4) of the 2 array elements 0724. We may even consider that Atx 0710 and Btx 0410 are on a first moving platform and Arx 0732 and Brx 0722 are on a second platform.

As depicted in FIG. 6, an input of a transmit CTF, say Ax, is assigned to a beam-forming-network (BFN) 0712 input of the Atx, while the CTF outputs may be specified as power received at all receiving elements of many receivers; such as two array elements 0724 of Brx 0722 and three array elements 0734 of Arx 0732. A Tx CTF in this case features a P-to-MP function with a BFN-A 0712 followed by [H$_A$] propagation matrix 0714. The coupling or interconnects between the BFN-A 0712 and the CSI in [H$_A$] 0714 are through the 3 transmitting antenna elements 0716.

The selected CSI measurements in the H matrix, [H$_A$] 0714, for the Tx CTF are initiated from 3 Tx elements 0716 of the transmitter Atx 0710 and "ended" at 5 receiving elements 0724 and 0734 of both receivers, Arx 0732 and Brx 0722. One of the 3 Tx CTF in FIG. 6 shall enable a transmitting signal string, Ax, to reach all 5 Rx elements on the receiving terminals with specified performance constraints by replicating the input Ax into three parallel streams in BFN-A 0712 followed by a optimized amplitude and phase weighting processing, before connected to the three Tx elements 0716. Thus an optimally weighted Ax signal stream is then launched, by the three Tx elements 0716, into multi-path dominated propagation channels characterized by the [H$_A$] matrix 0714.

Outputs of the [H$_A$] matrix 0714, also the outputs of the Tx CTF, at the 5 Rx elements may be assigned to inputs of a receiver DSP for further processing. On the other hand, the same outputs may be specified as desired performance constraints for optimization processing. There are three inputs, Ax, Ay, and Az, to the BFN-A 0712, which shall be associated with different sets of performance constraints such as on power density on various receiving elements; elements 1 through 5. A first stream of data, Ax, will be radiated by all 3 transmitting elements (element "a" through element "c") 0716 with a unique weighting distribution on radiated Ax by the 3 elements 0716. Concurrently, a second and a third data streams, Ay and Az, will also be transmitted by the same three elements 0716 accordingly.

Figure 7:
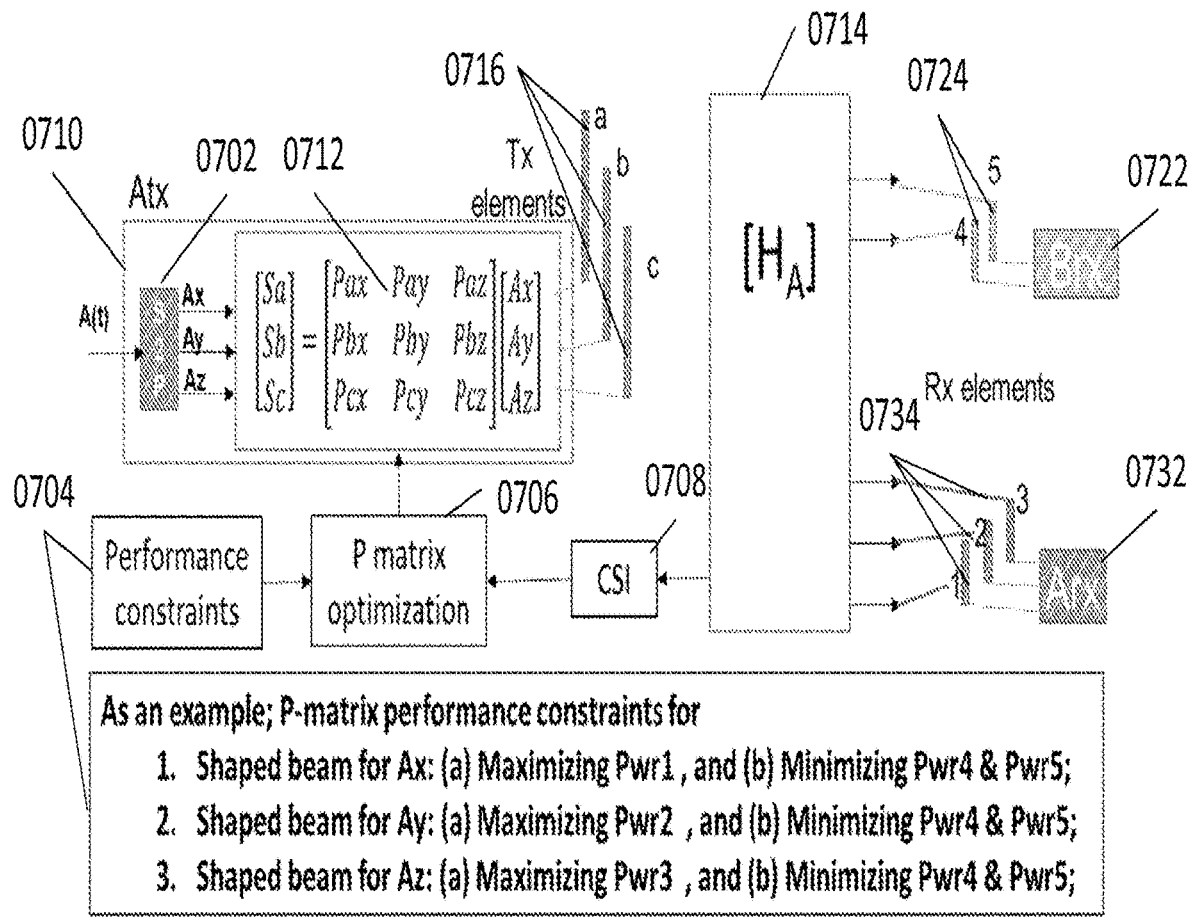
FIG. 7 depicts 3 Tx CTFs, respectively associated with 3 individually shaped concurrent beams.
Figure 8:
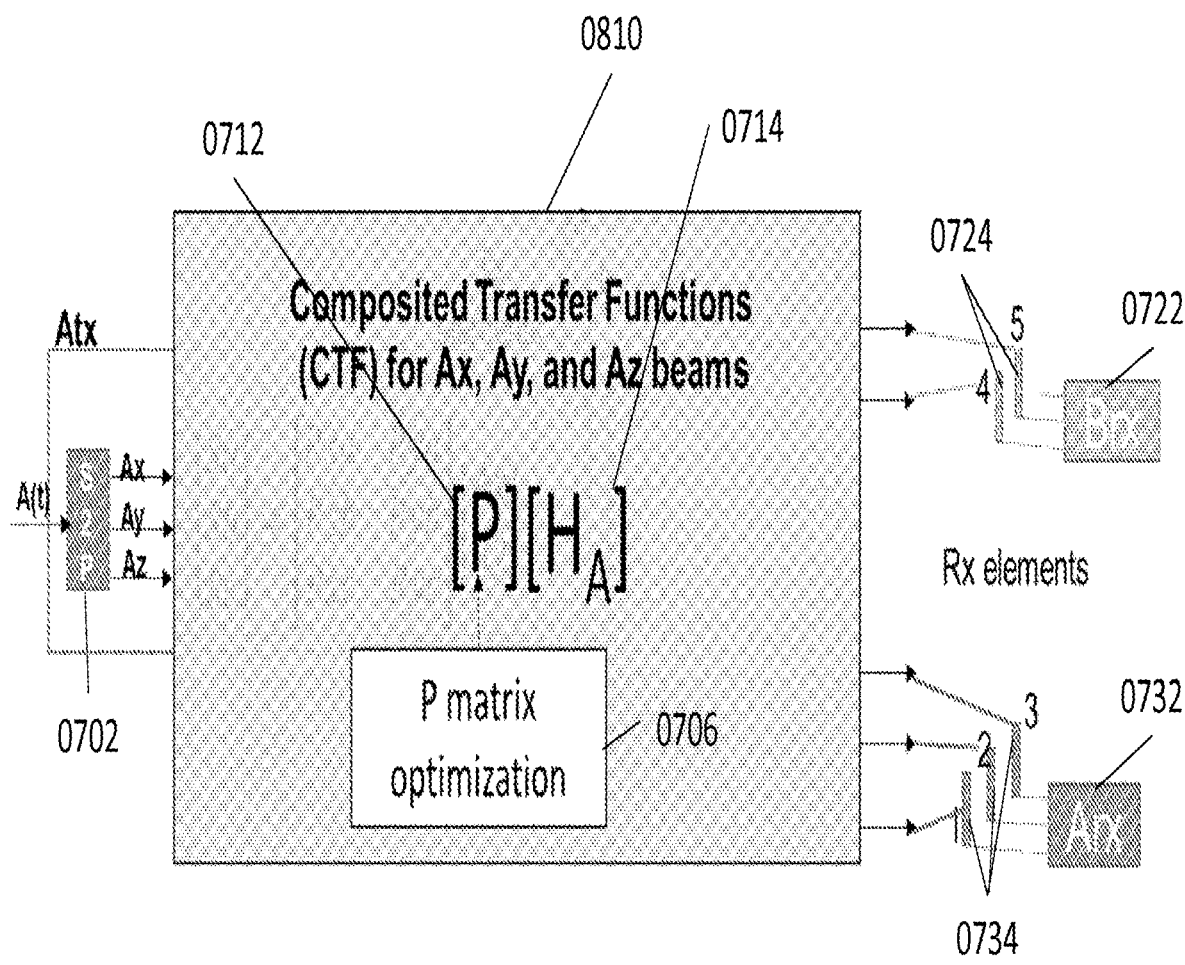
FIG. 8 depicts 3 Tx CTFs associated with 3 individually shaped concurrent beams in P-matrix optimization in the 1st transmitter Atx.

The inputs and the outputs of the BFN-A 0712 are characterized in the matrix equation depicted on the lower left corner of FIG. 6. The 3-to-3 BFN (BFN A) 0712 functions represented by a P matrix with 9 weighting parameters are optimized under 3 sets of performance constraints as indicated in FIG. 7 and FIG. 8.

All three beams optimized by the BFN-A 0712 will generate radiation patterns, after the multipath channel propagation, resulting 3 sets of individual transmitted or radiated wavefronts in which each shall favor one of the Rx elements 0734 of a first receiver Arx 0732 and discriminating against all Rx elements 0724 of a second receiver Brx 0722.

Formulations of Rx Composited Transfer Functions (Rx CTFs)

A receiving (Rx) CTF is a weighted sum of multiple p2p CSI and shall feature a prescribed characteristic of multiple inputs in a group of transmitters and a receiving output in a receiver; specifying desired performance constraints at various transmitting elements such as 0716 or transmitters such as 0710. Current measurements on the selected CSI for an Rx CTF are initiated from many Tx elements such as 0716 of various transmitters such as 0710 and "ended" at various receiving elements of a receiver, such as the receiver Arx 0732 to enable received signals by these Rx elements 0734 connected to a processing in the receiver Arx 0732 for optimized amplitude and phase weighting before summing. The combination of the selected CSI and the optimized receiving processor is called a Rx CTF. Output of the Rx CTF may be assigned to a DSP input of the receiver, while the CTF inputs at various Tx elements such as 0716 may be specified as desired performance constraints.

We will not do more on Rx CTF formulations and optimizations in this disclosure.

Unique Features in the CTFs Design Concepts
Composited Transfer Functions (CTF)
Tx CTF featuring point-to-multipoint (p2mp) performance as shown in FIG. 8,
Rx CTF featuring multipoint-to-point (mp2p) performance,
generated by linear combinations of multiple Channel-Status-Information (CSI) components as P matrixes 0712 for Atx 0710 and/or Q matrixes for Btx 0410; with specified performance constraints P/Q matrix optimized via Beam shaping optimization programs 0706.
Optimization via collaborated element indices not physical locations or angles.
Multipath via active scattering.
Scattering by active electronic devices on movable or re-locatable platforms;
enabling some controls over multipath propagation channels.
Simple techniques to have >>10× frequency reuse potentials Intragroup networks among multiple users in a group will feature similar concepts of ground-based beamforming (GBBF) for existing mobile satellite communications or remote beam forming networks (RBFN) for DBS satellites.

Simulation Results for Two Groups of Communication Pairs for N Times of Frequency Reuse Current simulations are setup according to a geometry depicted in FIG. 3 for scenarios under the following conditions;
1. all Tx elements are aligned along a line parallel to y-axis at x=Xt where Xt is a constant ranging from −100 m to −5 m
2. all Rx elements along a line parallel to y-axis at x=Xr where Xr is a constant ranging from 10 m to 100 m
3. all scatters are distributed near a line parallel to y-axis at x=Xs where Xs varies between −1 m to 1 m. They are placed in a range of ΔY near x=Xs. Scatter centers between −100 to 100 m with ΔY ranges from 0 to 200 m.

As a result, Tx radiation patterns are calculated over regions of interest and resulting pattern cuts are "plotted" along lines parallel to the y-axis at x=Xr and nearby. Similarly, Rx patterns are calculated over regions of interest and resulting pattern cuts are "plotted" along lines parallel to the y-axis at x=Xt and nearby.

All simulations are run assuming signals at 2.5 GHz. Optimization is via performance constraints specified by Rx element position indices only nor through element coordinates. However, the performances in terms of radiation patterns are all plotted along line length index.

The simulated results in here are all from Matlab based CVX. SDS does have its own optimization algorithms with more flexibility and less stringent on setting up performance constraints which may not be formulated on convex surfaces.

Tx Groups and Rx Groups in S-Band are Separated by 25 Meters

The following simulation results will show, among other phenomena, multipath effects from light of sight (LOS) propagations with and without the effects of scatters to the optimization capability in CTFs. Current simulations are setup for scenarios under the following conditions;
1. all Tx elements are lined up at x=Xt where Xt is set at −15 m,
2. all receiving elements parallel to y-axis at x=Xr where Xr is at 10 m,
3. all scatters are distributed near a line at x=Xs where Xs may vary between −1 m to 1 m. They are also placed in a range of ΔY near x=Xs, where ΔY is set at 20 m.

Independent Transmitters without Cooperation via Feeder Links

Figure 9:
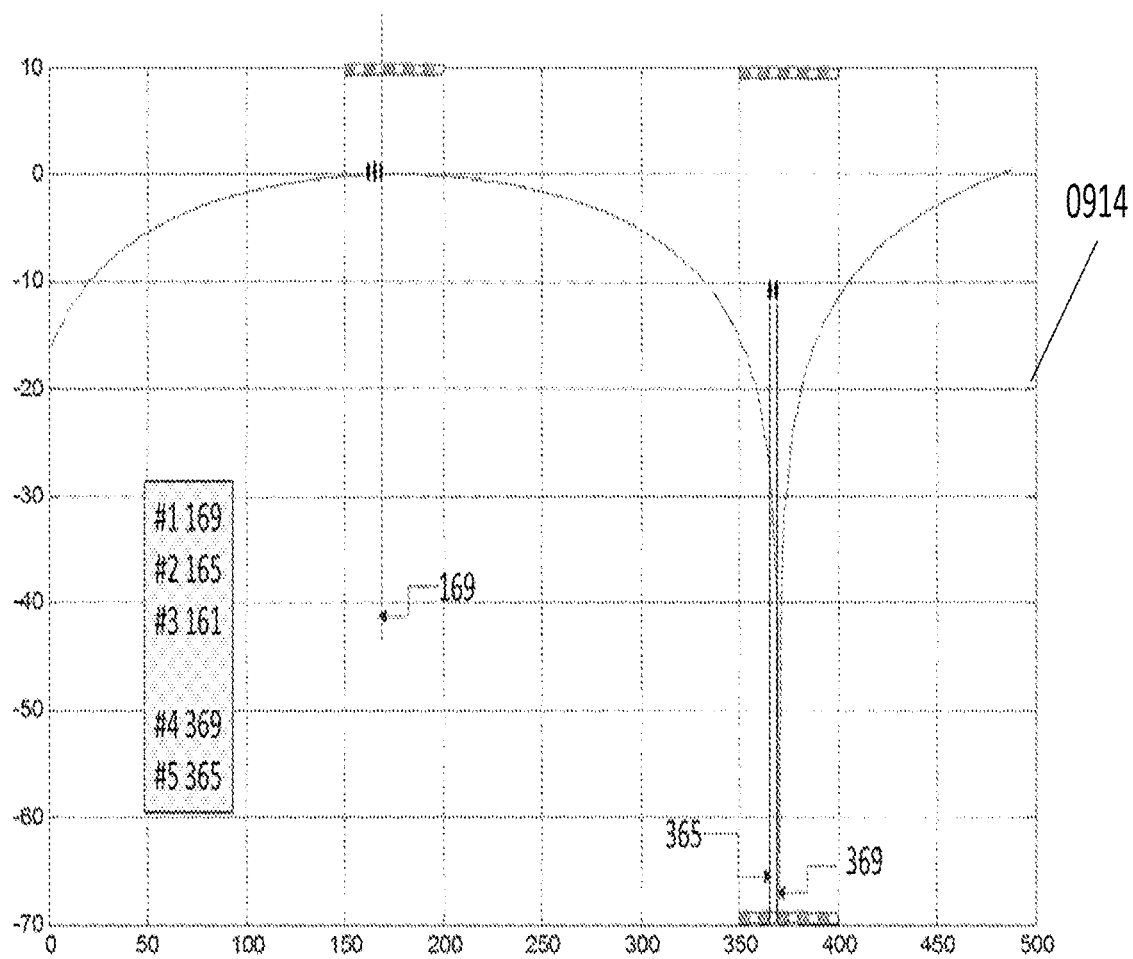
FIG. 9 depicts an optimized radiation pattern to peak at element #1 from the first transmitter via LOS paths only. The inherent geometry of the transmitting array feature a resolution separating a peak at element #1 and a null near the directions of elements #4 and that of #5; but not adequate for differentiating radiations at element #2 and #3 adjacent to the peak direction at element #1.
Figure 10:
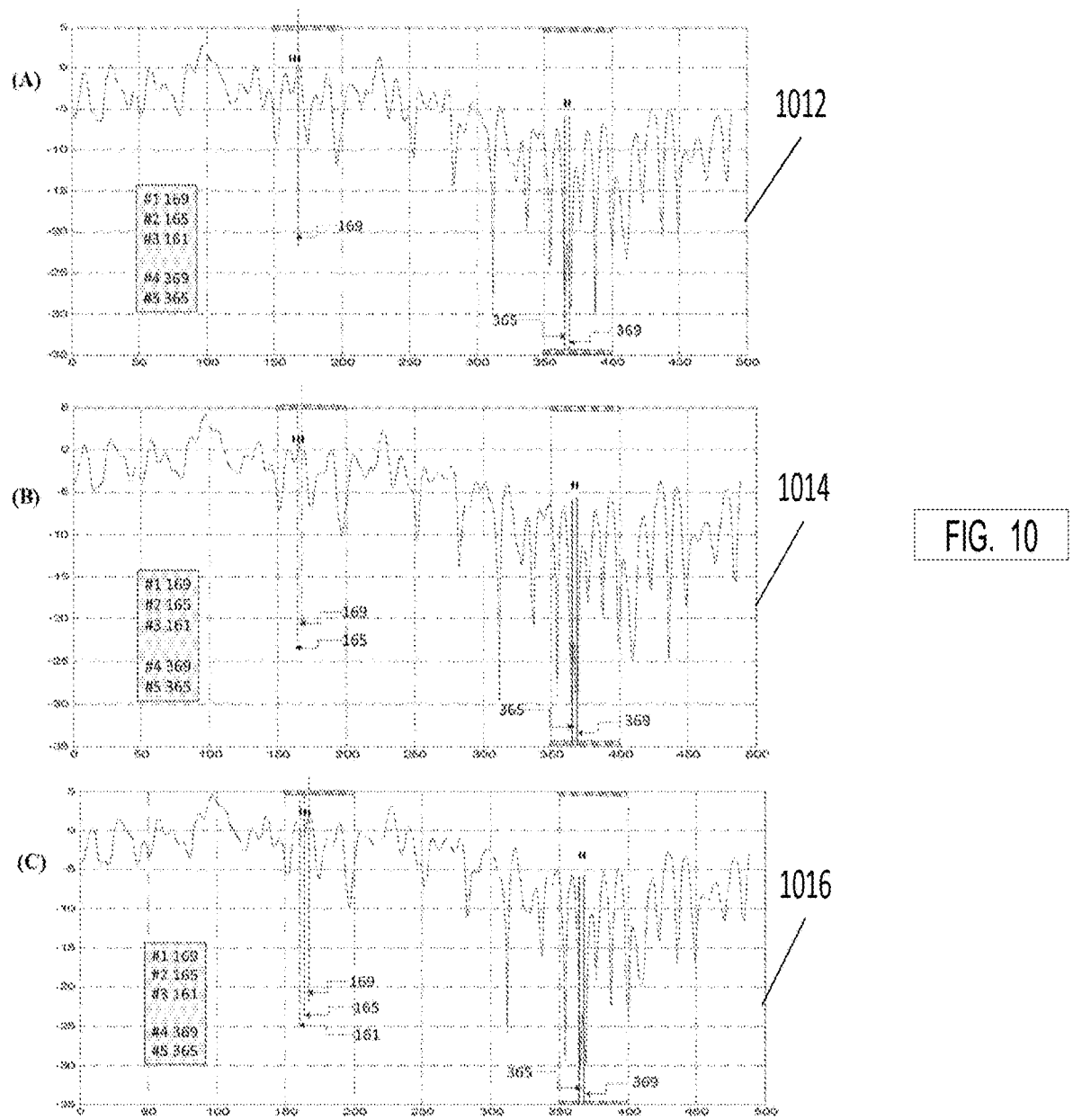
FIG. 10 depicts optimized radiation patterns from the first transmitter with both LOS effects and those from multipaths due to the 5 scatters under three different sets of performance constraints pointed at elements #1, #2, and #3, respectively.

CTFs or radiation patterns in FIG. 9 and FIG. 10 are results of beam forming on elements from a single transmitter but with performance constraints on elements from multiple receivers.

FIG. 9 depicts one of the optimized radiation patterns 0914 from 3 elements (a, b, and c) 0716 in the first transmitter Atx 0710 via line-of-sight (LOS) paths only without effects due to scatters. The shaped transmitting radiation pattern 0914 is a 2-D plot with a vertical axis in dB representing propagation gain and a horizontal axis for positional or directional indexes for receiving elements. It is designed to have a desired reference radiation level (usually a high gain level) to one of antenna elements (element 1) 0734 of the desire receiver Arx 0732 and concurrently steering nulls toward elements (elements 4 and 5) 0724 of the second receiver of Brx 0722.

The received array elements are indexed according to their locations along the line parallel to the y-axis at x=10 m. As a result of their coordinates in y-direction, elements #1, #2 and #3 of the receiving array 0734 for the first receiver Arx 0732 are indexed as 169, 165 and 161 while element #4 and #5 of the receiving array 0724 of the second receiver Brx 0722 are marked as 369 and 365.

The Tx radiation pattern 0914 by the three elements a, b, and c of the first transmitting array 0716 is optimized for Ax transmission and is shaped by a first set of performance constraints using an optimization algorithms; (1) a fixed power density (a specified reference) at Rx element 1 of the first receiving array 0734 and (2) average power density level at Rx elements 4 and 5 of the second receiving array 0724 is less than −30 db below the reference which is set at 0 dB in this example, and (3) radiated power in a receiving coverage area with position indexes ranged from 0 to 500 is minimized. Vertical auxiliary lines are drawn to facilitate viewing corresponding pattern levels among multiple receiving elements.

There are two more nearly identical shaped patterns (not shown) for Ay and Az transmissions. Their calculations are based on a different first performance constraint from the above mentioned 3 performance constraints; to have a fixed high-power density at element 2 for Ay pattern, and to have a fixed high-power density at element 3 for Az pattern, respectively. The other two constraints are identical.

It is clear that the first transmitter 0710 with the Tx array elements 0716 distributed over a 20 cm linear aperture or 1.67 wavelength, without effects of scatting of active scatters 0310, features spatial resolutions (with a 3 dB beamwidth about 35° near its boresight) not adequate for separating responses of Rx elements 1, 2, and 3 of the 3 Rx array elements 0734 of the first receiver Arx 0732. A rule of thumb may be stated that a spatial resolution of an aperture is about ½ of its 3 dB beamwidth. These Rx elements 0734 are >25 m away from the Tx array elements 0716 and are spaced by 0.1 m among their own adjacent elements 0734. However, the transmitter spatial resolutions appear barely adequate to separate elements of the Rx array 0734 of Arx 0732 from those 0724 of Brx 0722. These two receivers are 5 m apart and ~25 m from the radiating aperture 0716 of Atx 0710.

The best achievable frequency re-use is 2×; 1× between Atx 0710 and Arx 0732 as shown in FIG. 10; and another 1× between Btx 0410 and Brx 0722 even with post-processing in both receivers 0722 and 0732.

FIG. 10 depicts three optimized radiation patterns 1012, 1014 and 1016 from the same 3 elements (a, b, and c) of the transmitting array 0716 in the first transmitter Atx 0710 with both effects from scatters 0310 and those from line-of-sight paths. Shaped radiation patterns respectively optimized for Ax, Ay and Az are designed under the identical set of performance constraints as those in FIG. 9. It is clear that the first transmitter 0710 with multipaths due to scattering from active scatters 0310 features "better" spatial resolutions adequate to separate the Rx array elements 0734 of Arx 0732 from those 0724 of Brx 0722, and not quite for separating effects among the elements 1, 2, and 3 of the 3-element Rx array 0734 of Arx 0732.

It may require additional processing in Arx 0732 to separated three independent data streams Ax, Ay, and Az by linear processing of received signal streams by the three receiving elements 1, 2, and 3 of the 3-element Rx array 0734. The best achievable frequency re-use for this configuration is 4×; in which 3× between Atx 0710 and Arx 0732 (with additional processing on receiver Arx 0732); and ony 1× between Btx 0410 and Brx 0722 even with post-processing capability in receiver Brx 0722.

Cooperative Transmitters Via Feeder Links

Figure 11:
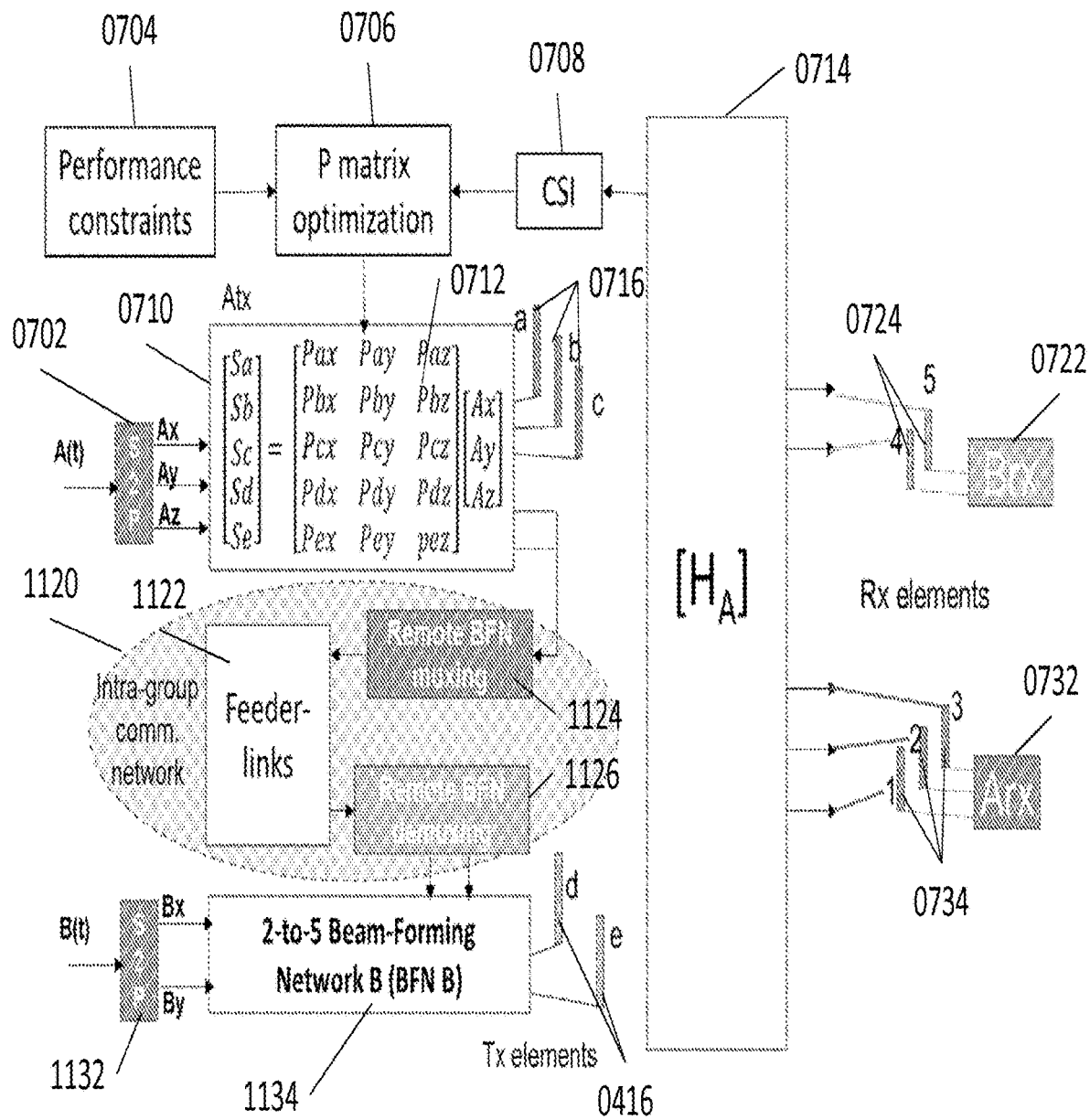
FIG. 11 depicts a simplified functional block diagram for Tx elements of a user shared among cooperative transmitters of other users; Atx of user A using two Btx's elements from user B.

FIG. 11 depicts a signal flow block diagram for a 1$^{st}$ transmitter Atx 0710 with its 3 own Tx elements 0716 while utilizing additional 2 Tx elements 0416 on a 2$^{nd}$ transmitter Btx 0410 for optimizing three CTFs belongs to the first transmitter Atx 0710. The intra-networks 1120 as shown between Atx 0710 and the BFN-B 1134 of the Btx 0410 are also referred to as feeder links or background networks. We will be using remote beam forming (or ground based beam forming) techniques which have been implemented in many existing mobile satellite communications systems. The new P-matrix 0712 associated with the 3 CTFs features a 3×5 matrix, where the 15 parameters are dynamically optimized. Dynamic calibrations and equalizations (not shown in here) among paths between a Tx beam forming processor and various remote Tx elements 0416 will be implemented via patented wavefront multiplexing techniques which were proposed for DBS satellite broadcasting.

CTFs or radiation patterns in FIG. 12 through FIG. 15 are results of beam-forming-networks (BFN) on elements from a single transmitter (such as Atx 0710) and on elements from other transmitters (such as Btx 0410) via remote-beam forming mechanisms. The element weighting parameters or weights in the BFNs are optimized under performance constraints on elements from multiple receivers (such as Arx 0732 and Brx 0722) at destinations.

Figure 12:
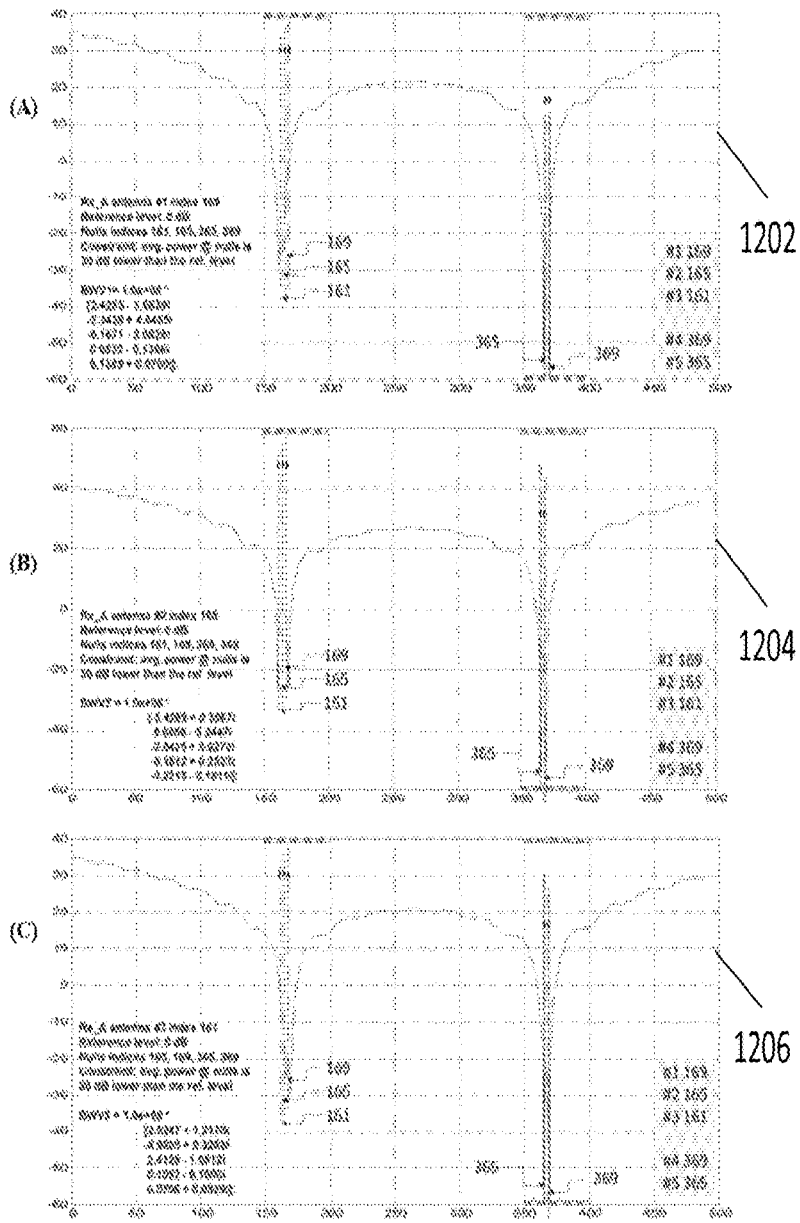
FIG. 12 depicts 3 optimized CTFs assuming LOS effects only, each pointing toward one Rx element while steering two nulls to the other two Rx elements of the Arx receiver, and forming additional two nulls to Rx elements 4 and 5 of the Brx receiver

FIG. 12 depicts three radiation pattern-cuts 1202, 1204, 1206 from all 5 transmitting elements coherently combined with optimized weightings assuming LOS effects only. They are 2-D plots; each with a vertical axis in dB representing propagation gain and a horizontal axis in positional or directional indexes for receiving elements, the same presentation format as that in FIG. 9. It is designed to have a desired reference radiation level (usually a high gain level) to one of Rx antenna elements (element 1) 0734 of the desire receiver Arx 0732 and concurrently steering nulls toward elements (elements 4 and 5) 0724 of the second receiver of Brx 0722. The 3 elements in Atx 0710 and 2 elements in Btx 0410 are all used in optimizing the independent 3 CTFs. Panel A 1202 features a reference direction pointing toward Rx element 1 of the 3-element Rx array 0734 while steering two nulls to the other two respective Rx elements (element 2 and 3) of the 3-element Rx array 0734 of the Arx receiver 0732, and forming additional two nulls to Rx elements 4 and 5 of the 2-element Rx array 0724 of the Brx receiver 0722.

Similarly, panels B 1204 and C 1206 feature, individually, a reference direction pointing toward Rx elements 2 and 3 of the 3-element Rx array 0734, respectively. The corresponding beam weight vectors (BWV) are shown on the lower left corners of the respective panels, each featuring 5 complex parameters representing the optimized weighting for the transmitting elements 0716 and 0416. The optimal beam shaping is aiming for 5× frequency re-use via orthogonal beams (OB). These three are OB radiation patterns, which feature 3 sets of BWVs corresponding to 3 OB radiation patterns. Any one beam peak of the 3 OB radiations is always at nulls of all other 2 OB radiations. It is clearly noticed that there are no significant different radiated power levels (with respect to a maximum or an averaged power density level over the plotted range) in the three panels at the intended beam peaks (the desired beam positions at element 1, 2, and 3 of the 3-element Rx array 0734 of Arx 0732). The peak and the averaged radiation levels, respectively, in all three panels feature ~35 dB and ~25 dB above the reference at 0 dB in various directional indexes. Rx element 1, 2, 3 of the 3-element Rx array 0734 are at the position index 169, 165 and 161 respectively.

There are total 5 possible Tx OB radiation patterns from 5 antenna elements. We only show 3 of 5 OB radiation patterns, which are for transmitting a signal stream A(t) through Atx 0710. As shown in FIG. 11, the signal stream A(t) is segmented by a series-to-parallel (S2P) converter 0702 into three segmented streams; Ax, Ay, and Az, which are three inputs to the CTFs 0712. The three CTFs shall take advantage of 3 local elements 0716 in Atx 0710 and 2 remote elements 0416 in Btx 0410.

The other two OB radiation patterns (not shown but in forms of two CTFs) are for transmitting signals of B(t) via 2 local elements 0416 in Btx 0410 and 3 remote elements 0716 in Atx 0710. B(t) is also segmented into two segments of Bx and By by a second S2P 1132 before transmissions. There shall be no mutual interferences among beams featuring a set of OB radiation patterns at intended destinations.

Figure 13:
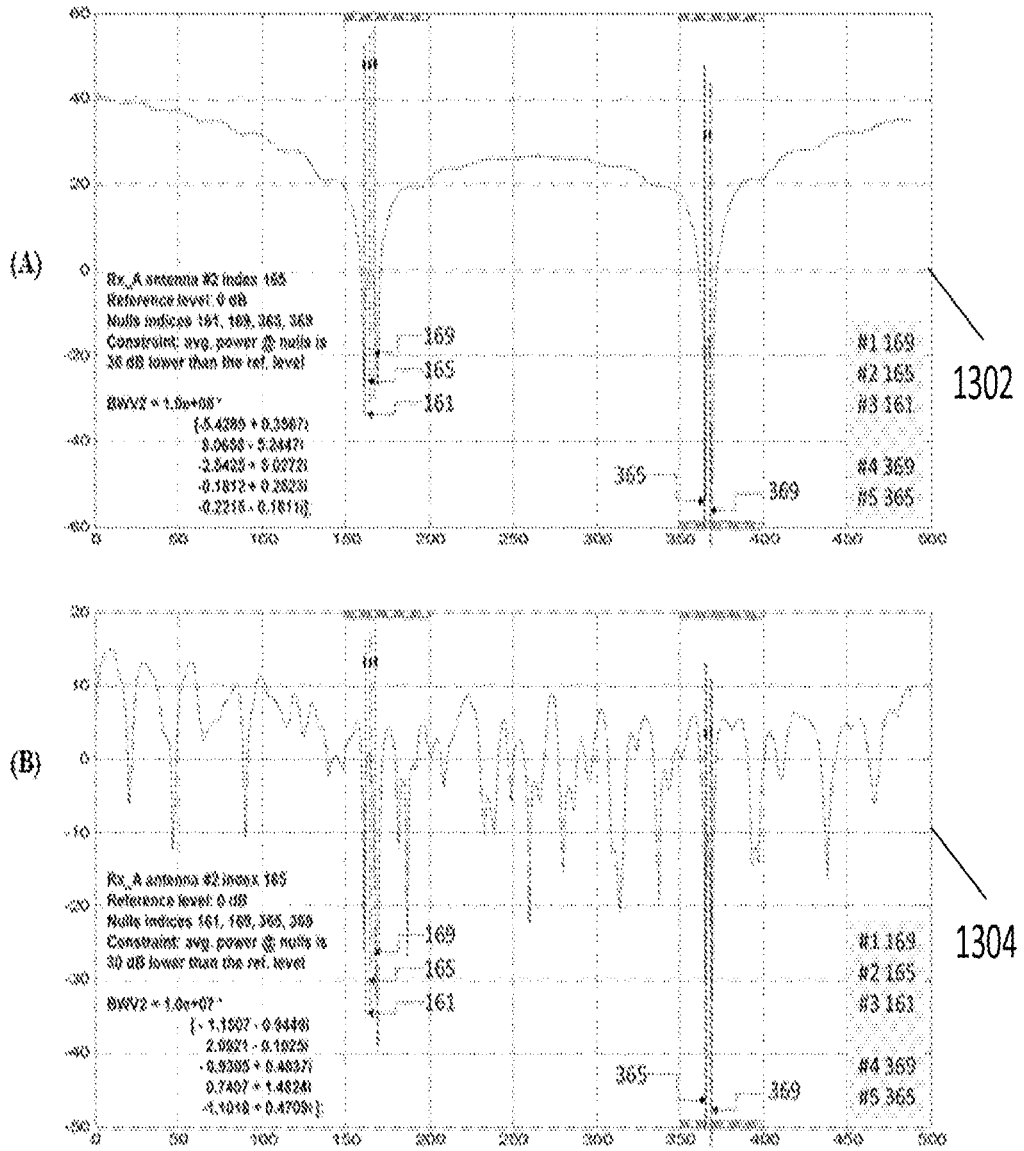
FIG. 13 depicts two optimized radiations; all 5 elements in Atx and Btx are used in optimizing a CTF pointing toward Rx element 2 while steering 4 nulls to Rx elements 1, 3, 4 and 5; panel (A) assuming with los effects only and panel (B) with effects from both los and scatters.

FIG. 13 depicts two Tx patterns from coherent radiations by 5 elements; 3 Atx elements 0716 and 2 Btx elements 0416; panel A 1302 assuming with LOS effects only and panel B 1304 with effects from both LOS and scatters 0310. All are used in optimizing an independent CTF pointing a desired receiving power density level toward element 2 of the Rx array 0736 of the Arx receiver 0732, while steering two nulls to Rx elements 1 and 3 of the Rx array 0736 of the Arx receiver 0732 and concurrently two more nulls to Rx elements 4 and 5 of the Rx array 0726 of the Brx receiver 0722.

The corresponding beam weight vectors (BWV) are shown on the lower left corners of the respective panels, each featuring 5 complex parameters representing the optimized weighting. There are 5 OB radiation pattern pairs, which feature total 5 pairs of BWVs corresponding to two sets of 5 OB radiation patterns. In each set, anyone beam peak of the 5 OB radiations is always at nulls of all other 4 OB radiations. We only show one of 5 OB radiation pairs.

It is clearly noticed in FIG. 13 that the significant different radiated power levels (with respect to a maximum or an averaged power density level over the plotted range) at the intended beam peaks (the desired beams at Rx element 2) in the two panels 1302 and 1304). The peak and the averaged radiation levels in Panel A 1302 feature, respectively, ~40 dB and ~20 dB above the reference at 0 dB, while those in Panel B 1304 are ~15 dB and ~5 dB above the 0-dB reference. The observation on the simulated results suggests that it would require more radiated power for scenarios with LOS effects only than those with both e LOS effects and effects with scatters. The observed phenomenon appears in all 4 other pairs.

Rx CTF formulations and optimizations are not shown in this disclosure.

The following simulation results will show, among other phenomena, the effects of scatters distributions to the optimization capability in CTFs. Tx groups with Intra-networks and Rx groups in S-band may be separated by up to 100 meters. Current simulations are setup for scenarios under the following conditions;

(1) all Tx elements are aligned along a line parallel to y-axis at x=Xt where Xt is at −15 m,
(2) all Rx elements along a line parallel to y-axis at x=Xr where Xr is a constant at 85 m, and
(3) all scatters are distributed near a line parallel to y-axis at x=Xs; where Xs may vary between −1 m to 1 m. They are also placed in a controllable range of Y near x=Xs. Scatters are placed with a maximum spacing Y at 10, 20, 40 or 80 m.

Figure 14:
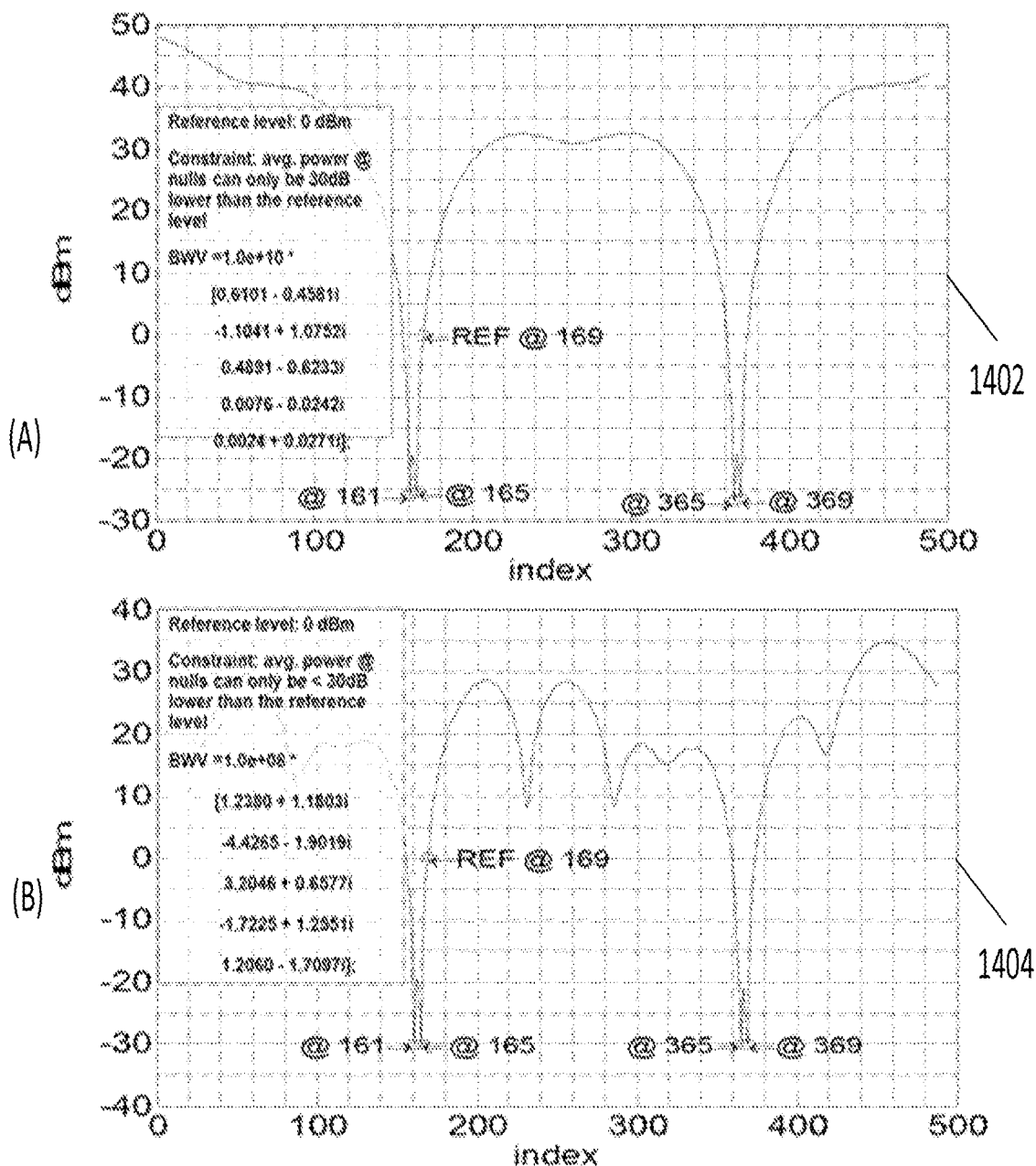
FIG. 14 depicts two optimized radiations over a 100m distance; panel (A) with LOS effects only and panel (B) with effects from both LOS and scatters over a Dy along y-axis; where $\Delta y=10$ m. Calculations are via Matlab simulations

FIG. 14 depicts two optimized radiations 1402 and 1404 between Tx and Rx over a 100 m distance; panel (A) 1402 with LOS effects only, and panel (B) 1404 with LOS effects and those from active scatters 0310 distributed over a 10 m linear range along y axis. They are both aiming for designs with 5× frequency re-using.

Figure 15:
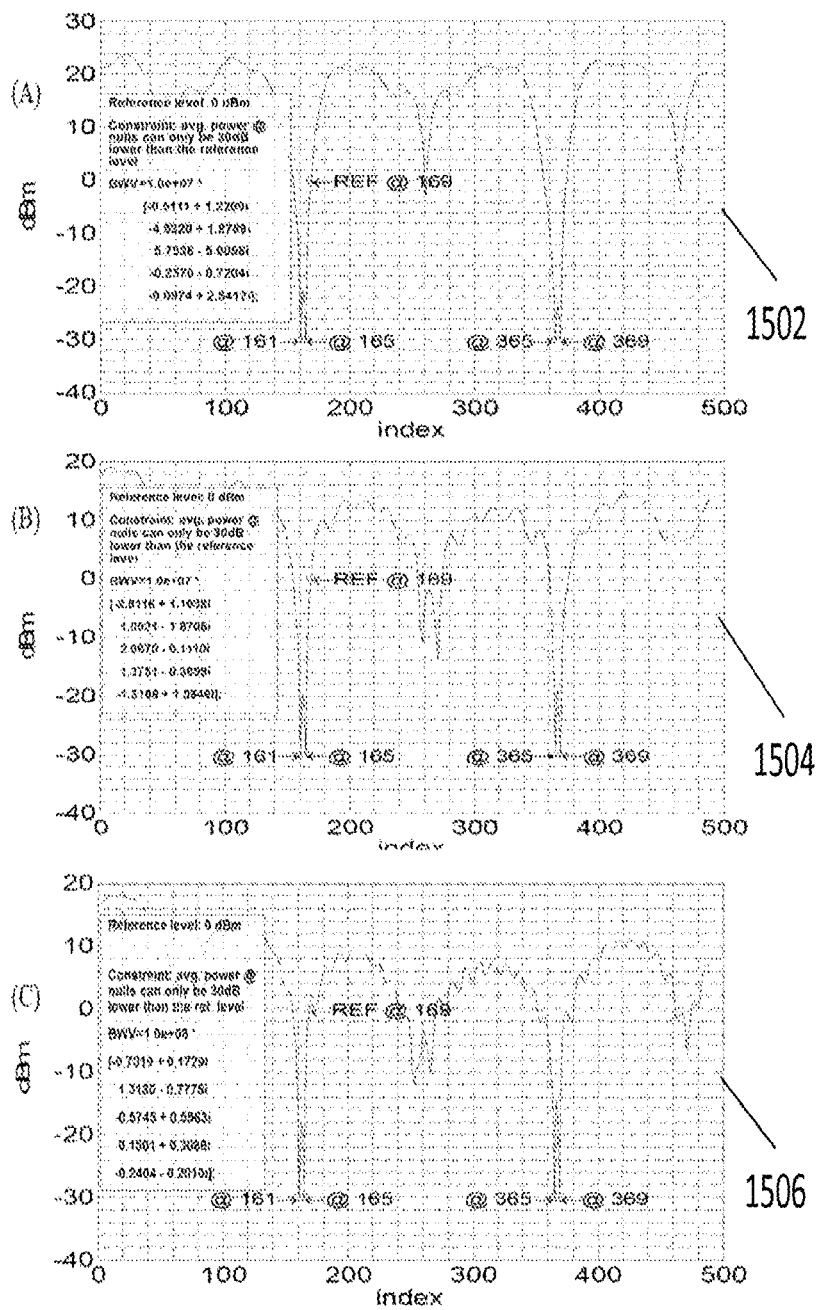
FIG. 15 depicts 3 CTF patterns for optimized beams pointing to Rx element 1 of Arx with scatters distributed in $\Delta y$; Panel A with $\Delta y$ at 20 m, Panels B and C $\Delta y$ at 40 m, and 80 m, respectively. Calculations are via Matlab simulations

It is also clearly in FIG. 14 that the significant different radiated power levels (with respect to a maximum or an averaged power density level over the plotted range) at the intended beam peaks (the desired beam positions at element 1 of the Rx array 0734 of Arx 0732) in the two panels 1402 and 1404. The peak and averaged radiation levels in Panel A 1402 feature, respectively, >45 dB and >30 dB above the reference at 0 dB, while those in Panel B 1404 are ~35 dB and ~20 dB above the reference. The observations suggest that it would require more radiated power for scenarios with LOS effects only than those with effects from both LOS and scatters. The observed phenomenon appears in all 4 other pairs. The optimized BWV are shown accordingly on the left side of the panels FIG. 15 depicts 3 calculated patterns for three optimized CTF's 1502, 1504 and 1506 under three different scatter distribution conditions. The three associated beams feature a fixed radiation level pointing to element 1 of Arx with the 5 active scatters distributed near linearly in y-direction and near uniformly over various $\Delta y$;

1. panel (A) 1502 with $\Delta y$ set at 20 m,
2. panel (B) 1504 with $\Delta y$ set at 40 m, and
3. panel (C) 1506 with $\Delta y$ set at 80 m, respectively.

The reference power density level of a receiving element located at the index 169 is always set at 0 dBm.

All optimization simulation runs are performed under another additional constraint of minimum total radiations from both Atx 0710 and Btx 0410.

It is noticed that the average power levels (by eye-balls) over an observable range along the y-axis are, respectively,
1. Panel (A) 1502~10 dBm,
2. Panel (B) 1504~7 dBm, and
3. Panel (C) 1506~4 dBm.

They are all aiming for designs with 5× frequency re-use.

Figure 16:
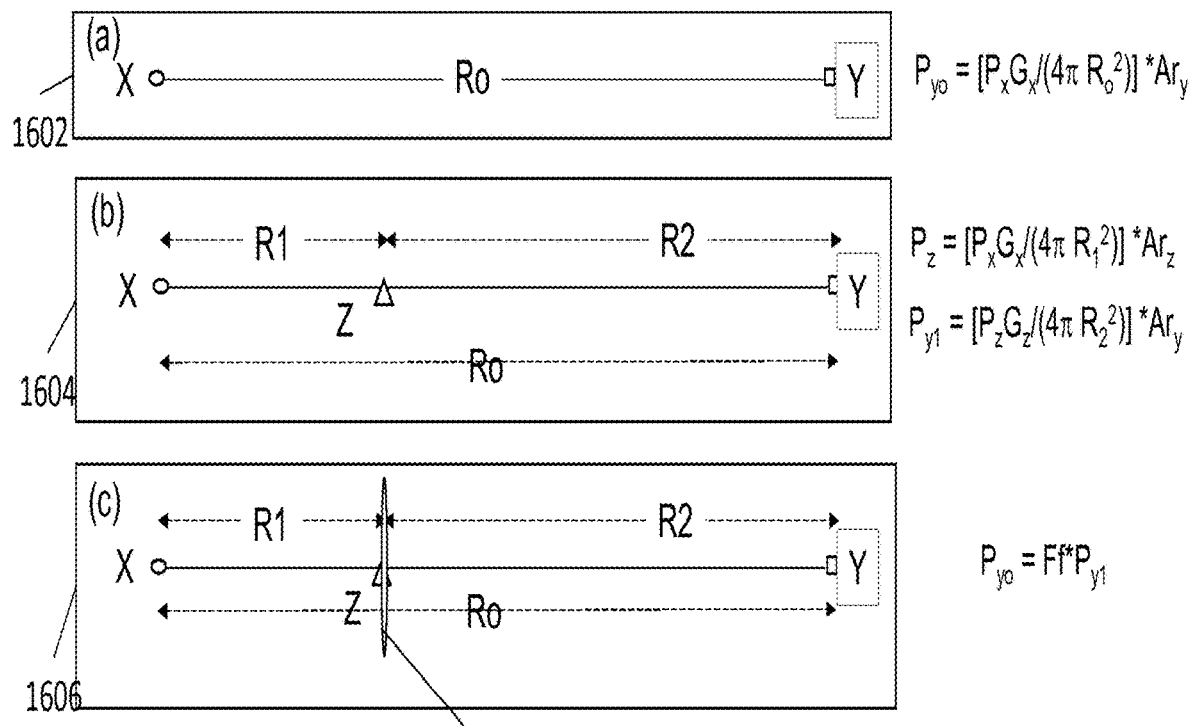
FIG. 16 depicts a relationship (including a geometry) of calculating a received power at a destination, Y, from a power source, X, through calculation of scattered power by a virtual scatter, Z, in between vs calculating power at the same destination directly via a Line of Sight (LOS) Propagation; a Fetch factor (Ff) is introduced in the virtual scatter technique to make the power arriving at destination identical to the direct diffusion result from a LOS propagation path.

FIG. 16 depicts a relationship (including a geometry) of calculating a received power at a destination, Y, from a power source, X. Conventional link calculations are used for received power at the destination "Y" via a line-of-sight (LOS) path in Panel (a) 1602, and its formulation is repeated in here;

$$P_{yo}=[P_x G_x/(4\pi R_o^2)]*Ar_y \qquad (2)$$

where; $P_{yo}$ is received power at location "Y" via a LOS path;
$P_x$ is transmitting power from location "X";
$G_x$ is transmitting antenna gain at location "X" in a direction pointed toward location Y;
$R_o$ is the LOS distance from location "X" to location "Y";
$Ar_y$ is the effective receiving aperture area of a receiving antenna at location "Y."

Similarly, in calculation of received power at location "Y" originated at location "X" and scattered by an active scatter at location "Z" as depicted in panel (b) 1604 conventional link calculations are used twice; a first time for received power at location "Z" from a source at location "X" via a line-of-sight (LOS) path, and a second time also destination "Y" from the re-radiation via another line-of-sight (LOS) path in panel (b) 1604 and its formulations are repeated in here;

$$P_z=[P_x G_x/(4\pi R_1^2)]*Ar_z \qquad (3a)$$

where; $P_z$ is received power at location "Z" from a source at location "X" via a LOS path;
$P_x$ is transmitting power from location "X";
$G_x$ is transmitting antenna gain at location "X" in a direction pointed toward location Y;
$R_1$ is the LOS distance from location "X" to location "Z";
$Ar_z$ is the effective receiving aperture area of a scatter at location "Z."
and $$P_{y1}=[P_{z1} G_z/(4\pi R_2^2)]*Ar_y \qquad (3b)$$

where; $P_{y1}$ is received power at location "Y" from scattering at location "Z" via a LOS path;
$P_{z1}$ is re-radiated power from location "Z";
$G_z$ is an equivalent antenna gain at location "Z" in a direction pointed toward location Y;
$R_2$ is the LOS distance from location "Z" to location "Y";
$Ar_y$ is the effective receiving aperture area of a receiving antenna at location "Y."

In equation (3a) and (3b), we further assume $P_{z1}=P_z$; that received power by an active scatter at "Z" will be re-radiated completely according to its equivalent radiation aperture.

It is also noticed that in general when the scatter is on the direct line of XY; or $$R_1+R_2 \geq R_o \qquad (4)$$

In 1678, Huygens proposed that every point which a luminous disturbance reaches becomes a source of a spherical wave; the sum of these secondary waves determines the form of the wave at any subsequent time. He assumed that the secondary waves travelled only in the "forward" direction and it is not explained in the theory why this is the case. He was able to provide a qualitative explanation of linear and spherical wave propagation, and to derive the laws of reflection and refraction using this principle, but could not explain the deviations from rectilinear propagation that occur when light encounters edges, apertures and screens, commonly known as diffraction effects.

Following Huygens principle, when there are sufficient virtual scatters in form of a cluster in a small volume, effects of their coherent components of re-radiations at the destination "Y" shall be a superposition from individual effects of all scatters in the cluster. The "effect" from a single scatter is prescribed by equation (3a) and (3b) or simply equation (3). We introduce a term "fetch factor" or Ff of a selected scatter, to represent the superposition over effects of all virtual scatters in the cluster or a "volume of coherency" around the selected scatter. When the selected virtual scatter happens to be on the direct line between location X and location Y as plotted in panel (c) 1606, then equation 4 will become $$R_1 + R_2 = R_o \qquad (4a)$$

The result yielded from equation (2) and that from equation (3) shall be identical. That formulation on panel (c) 1606 is repeated here as;

$$P_{yo} = Ff * P_{y1} \qquad (5)$$

FIG. 16A depicts formulations in calculating a Fetch factor (Ff); power at a destination via line-of-sights path 1612, and power at destination via a virtual scattering mechanism 1614. For a LOS propagation $$Po_{ry} = [P_{tx}G_{tx}/(4\pi R_o^2)] * Ar_y = (A_{tx} * Ar_y/R_o^{2*\lambda 2}) \qquad (6)$$

And for propagation via a virtual scatter, $$P_{rz} = [P_{tx}G_{tx}/(4\pi R_1^2)] * Ar_z, \qquad (7a)$$

and $$P1_{ry} = [P_{tz}G_{tz}/(4\pi R_2^2)] * Ar_y \qquad (7b)$$

Assuming $P_{tz} = P_{rz}$, then $$P1_{ry} = [P_{tz}G_{tz}/(4\pi R_2^2)] * Ar_y \qquad (8)$$
$$= P_{tx}G_{tx}G_{tz} * Ar_y[(4\pi R_1^2) * (4\pi R_2^2)] * Ar_z$$

FIG. 16B depicts continued formulations 1616 in calculating a Fetch factor (Ff) for a virtual scatter so that the resulting power in a destination from a LOS method 1612 shall be identical to that via calculating scattering effects by a virtual scatter 1614.

Setting $P1_{ry} = Po_{ry}$, $$1/(4\pi R_o^2) = Ff * G_{tz} * Ar_z / (4\pi R_1^2)(4\pi R_2^2) \qquad (9)$$
$$= Ff * A_{tz} * Ar_z / [4\pi\lambda^2 R_1^2 R_2^2]$$

therefore; $Ff = \lambda^2 R_1^2 R_2^2 / (R_o^2 A_{tz} * Ar_z) \qquad (10)$

Since Ff is a dimensionless factor, it can be re-written as following after we further assume $G_{rz} = G_{ta} = 1$, or $A_{tz} = Ar_z = \lambda^2/4\pi$, then $$Ff = (4\pi)^2 R_1^2 R_2^2/(R_o^2 \lambda^2) = [4\pi * R_1 * R_2/(R_o * \lambda)]^2 \qquad (11)$$

or $$Ff(dB) = 20 * \log 10[4\pi * R_1 * R_2/(R_o * \lambda)] \qquad (11a)$$

Figure 16C:
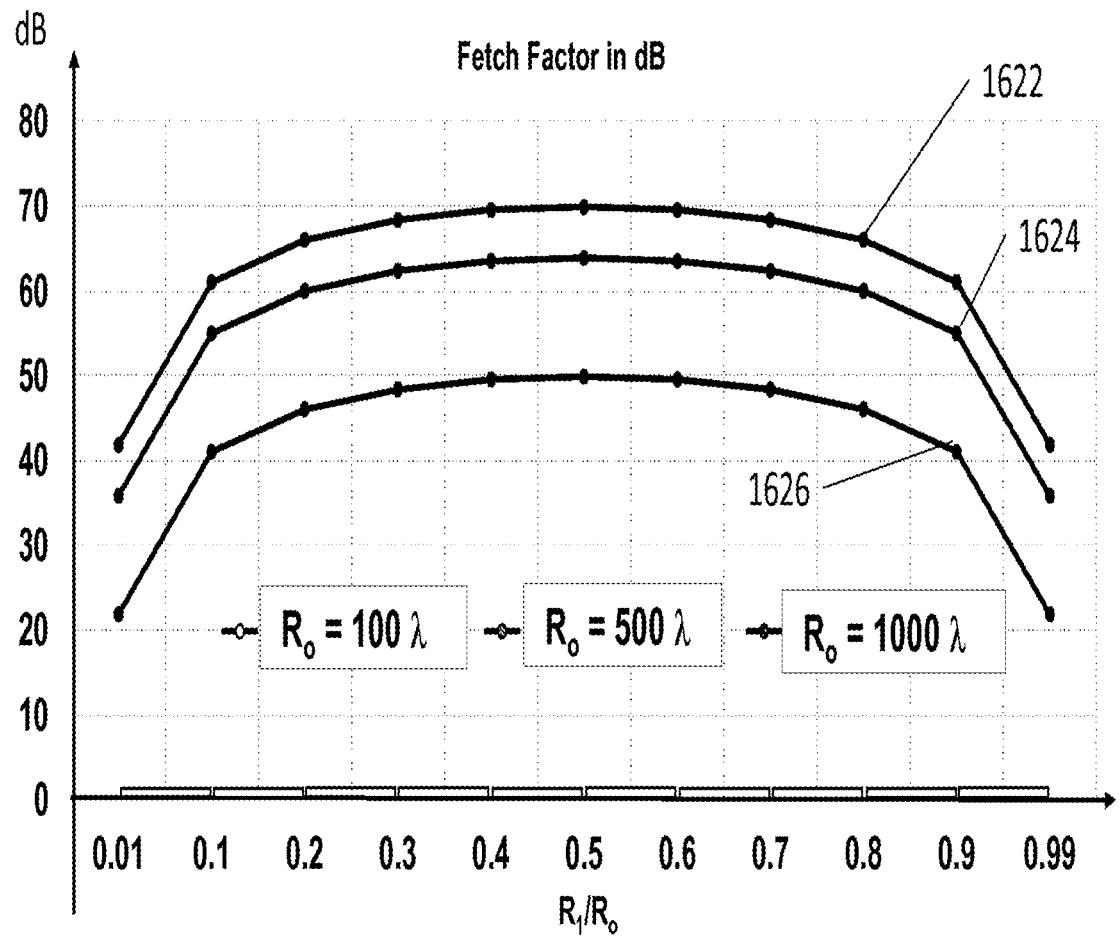
FIG. 16C depicts calculated distributions of A Fetch factor (Ff) in dB due to Propagation effects.

FIG. 16C depicts calculated distributions of Fetch factor (Ff) in dB numerically due to propagation effects including locations of scatters and 3 different total propagation distances. The Ff curves are plotted vs ratios of $R_1/R_o$ in between 0.01 and 0.99.

It is also noticed that the power density at destination over the LOS path can be used to gauge importance of path effects other than LOS; especially from an active scatter. When the scattered power density by a scatter arriving the destination were modulating signals at destination, say 20 dB below that of LOS path. There might be many of those low level scattering. However, an aggregated power level from 10 of them will still be $1/10^{th}$ of the power density of the LOS path. The active scattering would have very limited effects on that of the LOS path. No matter how we made variations on amplitudes and phases on the low level scattered power densities.

On the other hand, when the scattered power density by a second set of scattering platforms arriving the destination, each with 0 dB below that power density of LOS path. As a result, aggregated power levels from these scattering paths would have very significant effects on that of the LOS path. These re-radiated power levels would be able to significantly "modulate" signals from the LOS path at destination. The Ff may also be defined as an "amplification factor" or an "amplitude gain" in a repeater (on a scattering platform) so that the re-radiated power level from the repeater equal to that of a LOS path at the receiver in a destination.

When $R_o$ at 1000λ, or 120 m at 2.5 GHz, the curve 1622 shows that a Ff of 70 dB is required to become an effective scatter at a location where $R_1/R_o = 0.5$ or ~60 m away from a source and 60 m away for a destination in simulations. It also implies an integrated 70 dB gain is need for a real active repeater to become an effective scatter for 120 m wireless communications links.

When $R_o$ at 500λ, or 60 m at 2.5 GHz, the curve 1624 shows that a Ff of 65 dB is needed to become an effective scatter at $R_1/R_o = 0.5$ or at ~30 m away from a source and also 30 m away for a destination in simulations. It also implies an integrated 65 dB gain is need for a real active repeater to become an effective scatter for 60 m communications links.

When $R_o$ at 100λ, or 12 m at 2.5 GHz, the curve 1626 shows that a Ff of 50 dB is required to become an effective scatter at $R_1/R_o = 0.5$ or at ~6 m away from a source and also 6 m away for a destination in simulations. It also implies an integrated 50 dB gain is need for a real active repeater to become an effective scatter for 12 m communications links.

It is also noticed that when $R_1/R_o = 0.01$ or 0.99, the required Ff is about ~30 dB smaller than those at $R_1/R_o = 0.5$ for all three cases 1622, 624, and 1626. It is more efficient in generating MIMO for multiple frequency reuse by placing active scatters near a source or a destination than placing them around midpoints or centers of propagation channels between the source and the destination.

What is claimed is:
1. A communications system comprising:
   at least one receiver having a plurality of receiving elements;
   a transmitter comprising:
      a plurality of transmitting elements configured to transmit one or more signals to the receiving elements of the at least one receiver via a plurality of wireless propagation channels;
      a beam-forming network having input ports and output ports, receiving input signal streams at the input ports and outputting the one or more signals as shaped beams based on a set of composited transfer functions to the transmitting elements; and a channel measurement unit comprising a processor, configured to perform measurements of components of channel status information to generate a set of point-to-point transfer functions, each of the point-to-point transfer functions characterizing at least one propagation path from one of the transmitting elements to one of the receiving elements and generate the set of composited transfer functions by computing linear combinations of the point-to-point transfer functions, the composited transfer functions being point-to-multipoint transfer functions characterizing propagation paths from the input ports of the beam-forming network to one or more of the receiving elements and being represented as a product of a first matrix representing point-to-point transfer functions between the transmitting elements and the receiving elements and a second matrix representing transfer functions between the input ports and the output ports of the beam-forming network.

2. The communications system of claim 1, wherein each of the receiving elements is identified by a user element identification index in the point-to-point transfer functions and the at least one receiver is identified by a user identification index.

3. The communications system of claim 1 further comprising:

at least one active scattering platform located within the wireless propagation channels between the transmitter and the at least one receiver, the at least one active scattering platform being configured to receive and amplify the transmitted one or more signals and re-radiate the amplified received one or more signals toward the at least one receiver, wherein a location of the at least one active scattering platform is provided to the channel measurement unit.

4. The communications system of claim 3, wherein the channel measurement unit groups all propagation paths from one of the transmitting elements to one of the receiving elements and generates a corresponding point-to-point transfer function.

5. The communications system of claim 3, wherein the at least one active scattering platform is stationary or relocatable or mobile.

6. The communications system of claim 3, wherein the at least one active scattering platform is a repeater comprising a first transponder and a second transponder functionally cascaded and spatially separated, the first transponder receiving the transmitted one or more signals at a first frequency slot, amplifying, filtering, frequency translating the received one or more signals before radiating the received one or more signals out at a second frequency slot, the second transponder receiving the radiated one or more signals at the second frequency slot, amplifying, filtering, frequency translating and power amplifying the received radiated one or more signals before re-radiating the power-amplified one or more signals out at the first frequency slot.

7. The communications system of claim 3, wherein the at least one active scattering platform has at least one of the group of variable amplification gain, shapeable receiving antenna gain, and shapeable transmitting antenna gain.

8. The communications system of claim 1, wherein the channel measurement unit comprises an optimization processor to perform optimization for the shaped beams by updating complex weighting parameters of the composited transfer functions.

9. The communications system of claim 8, wherein the optimization processor performs optimization for the shaped beams using beam shaping techniques under performance constraints associated with locations indexed by identification of the at least one receiver or by identification of each of the receiving elements.

10. The communications system of claim 9, wherein the performance constraints comprise performance constraints on a set of orthogonal beams included in the shaped beams.

11. A method for wireless communications, comprising:

providing at least one receiver having a plurality of receiving elements;

providing a transmitter including a plurality of transmitting elements, a beam-forming network having input ports and output ports, and a channel measurement unit including a processor;

receiving input signal streams at the input ports of the beam-forming network;

outputting, from the output ports of the beam-forming network, one or more signals as shaped beams based on a set of composited transfer functions to the transmitting elements;

performing, via the channel measurement unit, measurements of components of channel status information to generate a set of point-to-point transfer functions, each of the point-to-point transfer functions characterizing at least one propagation path from one of the transmitting elements to one of the receiving elements;

generating, via the channel measurement unit, the set of composited transfer functions by computing linear combinations of the point-to-point transfer functions, the composited transfer functions being point-to-multipoint transfer functions characterizing propagation paths from the input ports of the beam-forming network to one or more of the receiving elements and being represented as a product of a first matrix representing point-to-point transfer functions between the transmitting elements and the receiving elements and a second matrix representing transfer functions between the input ports and the output ports of the beam-forming network; and transmitting, using the transmitting elements, the shaped beams including the one or more signals to the receiving elements of the at least one receiver via a plurality of wireless propagation channels.

12. The method of claim 11, wherein each of the receiving elements is identified by a user element identification index in the point-to-point transfer functions and the at least one receiver is identified by a user identification index.

13. The method of claim 11 further comprising:

providing at least one active scattering platform located within the wireless propagation channels between the transmitter and the at least one receiver;

providing a location of the at least one active scattering platform to the channel measurement unit;

receiving the transmitted one or more signals, via the at least one active scattering platform;

amplifying the received one or more signals, via the at least one active scattering platform; and re-radiating the amplified one or more signals toward the at least one receiver, via the at least one active scattering platform.

14. The method of claim 13, wherein performing measurements of components of channel status information comprises grouping all propagation paths from one of the transmitting elements to one of the receiving elements and generating a corresponding point-to-point transfer function.

15. The method of claim 13, wherein providing the at least one active scattering platform includes providing at least one stationary or relocatable or mobile active scattering platform.

16. The method of claim 13, wherein providing the at least one active scattering platform includes providing a repeater comprising a first transponder and a second transponder functionally cascaded and spatially separated, the first transponder receiving the transmitted one or more signals at a first frequency slot, amplifying, filtering, frequency translating the received one or more signals before radiating the received one or more signals out at a second frequency slot, the second transponder receiving the radiated one or more signals at the second frequency slot, amplifying, filtering, frequency translating and power amplifying the received radiated one or more signals before re-radiating the power-amplified one or more signals out at the first frequency slot.

17. The method of claim 11 further comprising:
performing optimization for the shaped beams, via an optimization processor included in the channel measurement unit, by updating complex weighting parameters of the composited transfer functions.

18. The method of claim 17, wherein the optimization processor performs optimization for the shaped beams using beam shaping techniques under performance constraints associated with locations indexed by identification of the at least one receiver or by identification of each of the receiving elements.

19. A method for wireless communications, comprising:
providing a receiver comprising a plurality of receiving elements and a channel measurement unit comprising a processor and having an output port;
providing at least one transmitter having a plurality of transmitting elements configured to transmit one or more signals to the receiving elements of the receiver via a plurality of wireless propagation channels;
providing at least one active scattering platform located within the wireless propagation channels between the at least one transmitter and the receiver, the at least one active scattering platform being configured to receive and amplify the transmitted one or more signals and re-radiate the amplified one or more signals toward the receiver;
performing, via the channel measurement unit, measurements of components of channel status information to generate a set of point-to-point transfer functions, each of the point-to-point transfer functions characterizing propagation paths from one of the transmitting elements to one of the receiving elements; and
generating, via the channel measurement unit, a set of composited transfer functions by computing linear combinations of the point-to-point transfer functions, the composited transfer functions being multipoint-to-point transfer functions characterizing propagation paths from one or more of the transmitting elements to the output port of the receiver and specifying desired performance constraints at one or more of the transmitting elements or at the at least one transmitter and representing shaped receiving beams for the receiving elements to receive the re-radiated one or more signals.

20. The method of claim 19 further comprising:
performing optimization of the shaped receiving beams, via an optimization processor included in the channel measurement unit, by updating complex weighting parameters of the composited transfer functions.

* * * * *